United States Patent
Das et al.

(10) Patent No.: US 10,713,271 B2
(45) Date of Patent: Jul. 14, 2020

(54) QUERYING DISTRIBUTED LOG DATA USING VIRTUAL FIELDS DEFINED IN QUERY STRINGS

(71) Applicant: Oracle International Corporation, Redwood Shores, CA (US)

(72) Inventors: Sreeji Das, Fremont, CA (US); Jae Young Yoon, San Mateo, CA (US); Dhileeban Kumaresan, Telangana (IN); Venktesh Alvenkar, Telangana (IN); Harish Akali, Acton, MA (US); Adrienne Wong, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 216 days.

(21) Appl. No.: 15/888,890

(22) Filed: Feb. 5, 2018

(65) Prior Publication Data

US 2018/0232425 A1    Aug. 16, 2018

Related U.S. Application Data

(60) Provisional application No. 62/457,644, filed on Feb. 10, 2017.

(51) Int. Cl.
| | | |
|---|---|---|
| *G06F 16/00* | (2019.01) | |
| *G06F 16/248* | (2019.01) | |
| *G06F 16/28* | (2019.01) | |
| *G06F 16/951* | (2019.01) | |
| *G06F 16/2458* | (2019.01) | |
| *G06F 11/34* | (2006.01) | |
| *G06F 17/40* | (2006.01) | |
| *G06F 40/205* | (2020.01) | |

(52) U.S. Cl.
CPC ........ *G06F 16/248* (2019.01); *G06F 11/3476* (2013.01); *G06F 16/2471* (2019.01); *G06F 16/285* (2019.01); *G06F 16/951* (2019.01); *G06F 17/40* (2013.01); *G06F 40/205* (2020.01)

(58) Field of Classification Search
CPC .... G06F 16/248; G06F 16/285; G06F 16/951; G06F 16/2471; G06F 11/3476
See application file for complete search history.

(56) References Cited

U.S. PATENT DOCUMENTS

| | | | | |
|---|---|---|---|---|
| 6,134,591 A * | 10/2000 | Nickles | .................... | H04L 29/06 709/217 |
| 7,653,633 B2 * | 1/2010 | Villella | ............... | G06F 11/3476 370/386 |
| 9,811,562 B2 * | 11/2017 | Tidwell | ............... | G06F 16/2455 |
| 10,122,575 B2 * | 11/2018 | Petersen | ............. | G06F 11/0709 |
| 10,338,977 B2 * | 7/2019 | Yoon | ........................ | G06F 9/546 |
| 10,353,756 B2 * | 7/2019 | Yoon | ...................... | H04L 41/069 |
| 10,474,513 B2 * | 11/2019 | Yoon | ...................... | G06F 16/358 |
| 2010/0211826 A1 * | 8/2010 | Villella | ............... | G06F 11/3476 714/39 |
| 2011/0314148 A1 * | 12/2011 | Petersen | ............. | G06F 11/3476 709/224 |

(Continued)

*Primary Examiner* — Jean M Corrielus
(74) *Attorney, Agent, or Firm* — Kilpatrick Townsend & Stockton LLP

(57) ABSTRACT

The present disclosure relates to querying log messages stored at log endpoints (e.g., log cores) using query strings that reference virtual fields, and generating log field views presenting aggregate information for groups of log messages that are grouped based on criteria defined in the query string.

23 Claims, 15 Drawing Sheets

(56) References Cited

U.S. PATENT DOCUMENTS

| | | | |
|---|---|---|---|
| 2012/0005542 A1* | 1/2012 | Petersen | G06F 11/0709 |
| | | | 714/48 |
| 2012/0246303 A1* | 9/2012 | Petersen | G06F 16/1734 |
| | | | 709/224 |
| 2016/0248791 A1* | 8/2016 | Tidwell | G06F 16/2455 |
| 2016/0248792 A1* | 8/2016 | Tidwell | G06F 16/2455 |
| 2016/0301561 A1* | 10/2016 | Petersen | G06F 11/0709 |
| 2018/0101423 A1* | 4/2018 | Yoon | G06F 16/358 |
| 2018/0113578 A1* | 4/2018 | Yoon | G06F 16/35 |
| 2018/0114126 A1* | 4/2018 | Das | G06F 16/35 |

\* cited by examiner

QUERYING DISTRIBUTED LOG DATA USING VIRTUAL FIELDS DEFINED IN QUERY STRINGS

CROSS REFERENCE TO RELATED APPLICATIONS

This application claims the priority benefit of U.S. Provisional Application No. 62/457,644, filed on Feb. 10, 2017, the entirety of the disclosure of which is incorporated by reference herein for all purposes.

TECHNICAL FIELD

The present disclosure generally relates to querying distributed log data using virtual fields defined in query strings. More particularly, the present disclosure relates to systems and methods for parsing log messages that are in various formats and that are stored across multiple log endpoints (e.g., log cores), querying the log messages using query strings that reference virtual fields, and generating log field views presenting aggregate information for groups of log messages that are grouped based on criteria defined in the query string.

BACKGROUND

Log messages are generally stored in a distributed manner across several log endpoints (e.g., log cores). Further, the load of log messages stored at each log endpoint is increasingly becoming larger. Certain platforms have been used to perform operations (e.g., queries) involving the log messages. However, as log messages for a given transaction become increasingly distributed and as the need for richer functionality increases, these platforms lack support for complex operations and are typically burdensome on processing resources.

SUMMARY

Certain aspects and features of the present disclosure relate to systems and methods for querying log messages stored in a distributed manner across multiple log endpoints. Querying log messages may be performed by providing an interface that enables a user to define query strings. The interface may enable the user to define a virtual field within a query string. For example, a virtual field may be a user-defined data field that does not exist in a log message as a data field. Further, the virtual field can be referenced in the query string as a function or expression of one or more existing data fields within a log message. At runtime, executing the query string may include querying the multiple log endpoints based on the one or more existing data fields included in the query string, and performing the function or expression of the virtual field on any values returned from the query. Advantageously, the function or expression of the virtual field may be performed, regardless of the format of the log messages. For instance, a particular data field may not always be positioned in the same location across all log messages. In some cases, a first application may generate or record a log message in a first format and a second application may generate or record a log message in a second format (e.g., such that the first format is different from the second format), and one or more data fields in each of the first format and the second format may be different. Accordingly, the systems and methods described herein provide techniques for querying the multiple log endpoints and performing the function or expression of the virtual field using existing data fields after parsing log messages of potentially different formats.

To illustrate further and as a non-limiting example, a first application may generate a first log message as part of an interaction with a first user device. The first log message may be represented by one or more data fields in a particular order. For example, a data field in the first log message may be a "host name" of a host interacting with the first user device. A second application may generate a second log message as part of a transaction with a second user device (or potentially with the first user device). The second log message may be represented by one or more data fields in an order different from the particular order of the first log message. For example, a data field in the second log message may be a "host name" of a host interacting with the first or second user device, however, the "host name" data field in the second log message may be positioned in a different location than the "host name" data field in the first log message. In some implementations, some or all of the data fields of the first log message may be the same as the data fields in the second log message.

In some implementations, one or more data parsers may be configured to parse log messages of potentially different formats. For example, a data parser can parse log messages in which different data field names are positioned in different locations within the log messages, or potentially, the same data field name may be positioned in different locations across multiple log messages. Executing the query string can include parsing the log messages to extract the target data, querying the log endpoints with the target data, and performing the function of expression of the virtual field on the query result.

In certain embodiments, the systems and methods relate to a distributed processing layer that provides the ability for users to perform complex log analytics on log messages that are stored across one or more log endpoints. For example, a set of log messages may represent a particular interaction between one or more servers and a user device (e.g., as part of a process flow of interactions, such as logging into an account and interacting with the account). Further, type information can be generated based on a mapping of a log message to a message skeleton. For example, the type information can include a data field of a log message (e.g., "IP Address of a log message"). A data field can include a value present in the log message, and the value may be separated from other data fields by certain detectable code.

In certain embodiments, an interface can be provided that enables a user to define a query string for querying the log messages. The interface can be configured to receive input corresponding to the query string. For example, the interface can receive input corresponding to a selection of an object representing a data field (e.g., a selectable element displayed on the interface). In this example, the interface can enable the user to drag-and-drop the selectable object to a query builder. When the selectable object is moved to the area representing the query builder, the interface can automatically include the data field corresponding to the selectable object into the query string. In some implementations, the interface may enable the user to enter in the query string in a natural-language format. For example, the interface may evaluate the natural-language text to extract data fields and/or virtual data fields. In some examples, the query string can reference one or more virtual fields. For example, a virtual field does not appear or is not present in a log message or message structure (e.g., as a data field), but can be referenced in the query string as a function of an existing data field within log messages. As a non-limiting example, a virtual field of "transfer ratio" can be defined in the query string as "bytes in"/"bytes out" where "bytes in" and "bytes out" are each existing data fields of a log message, and where "transfer ratio" is not a data field that exists the log message. The query string can be parsed to detect the virtual fields.

In certain embodiments, a query layer (e.g., a coordinator) can construct a response to the query executed using the query string. In some examples, constructing a response can include querying the log endpoints using the existing data fields included in the query string, and receiving a partial result (in response to the query) from each log endpoint of the multiple log endpoints. Further, the query layer can aggregate the partial results received from the log endpoints to determine a preliminary result for the existing data field. Aggregating can also include performing a function on the preliminary result to determine the constructed response to the query string that referenced the virtual field.

In certain embodiments, a log field view that represents the constructed response to the query string can be generated. The constructed response can present aggregate result data (e.g., a count of log messages) for two or more groups of log messages that are grouped based on criteria expressed in the query string. Further, the constructed response can provide two or more distinct values for the virtual data field referenced in the query string. For example, the two or more distinct values may be distinct aggregated values when the query is grouped by another data field or distinct values when the query is grouped by the virtual data field, where one or more aggregate values for one or more other data fields are provided in the latter scenario. The generated log field view can be presented at the interface, such that the aggregated and optionally filtered sets of log data including the virtual field is useable for drill down into the log messages themselves.

In certain embodiments, field names that are referenced in the query string can be detected and validated by a query layer. Further, the query string can be transformed into simpler-to-execute back-end JSON (JavaScript Object Notation) data structure that uses back-end field names and back-end data types to execute the query. The JSON data structure can be shipped to log endpoints (possibly through a separate coordinator). In some cases, the query string that is received via the interface can be parsed (at a query layer) to detect and/or validate the field names referenced in the query string. For example, validating can include determining whether the detected field name is a known-to-the-validation-engine front-end field name that is actually mapped to a back-end field name used by the plurality of log endpoints. Further, parsing can include determining whether the detected field name corresponds to a data field included in the query string. The query layer can also transform the query string into a JSON data structure. The query string may not include field names in an order that is optimized for executing at the log endpoints, however, transforming the query string into a JSON data structure ensures that the query string is optimized for execution at back-end servers.

In some examples, transforming the query string into the JSON data structure includes transforming the detected field name into a back-end field name that is executable by two or more of the plurality of log endpoints. Further, transforming can include referencing one or more aggregate values that require the two or more of the plurality of log endpoints to retrieve from a query execution coordinator in an intermediate step of executing the JSON data structure. The JSON data structure can be transmitted (e.g., shipped) to each of the multiple log endpoints to be executed at the log endpoint. Executing the JSON data structure corresponds to performing a query using the query string at each of the log endpoints. In some examples, the JSON data structure can be based on a time range. For instance, after the query string is transformed into the JSON data structure, one or more particular log endpoints can be selected for executing the JSON data structure based at least in part on a range of time requested by the JSON data structure and different ranges of time covered by the plurality of log endpoints. One or more other particular log endpoints are not selected for executing the JSON data structure. The JSON data structure can be transmitted to the one or more particular log endpoints that were selected. When the JSON structure is received at a log endpoint, the JSON data structure is executed, such that a query is performed at each of the one or more log endpoints using the back-end field name.

Embodiments of the present disclosure provide a computer-implemented method. The method may include receiving a plurality of log messages. Each log message of the plurality of log messages may include message data. For example, the message data may include one or more detectable signatures that are used to segment the message data into one or more data fields. The method may include mapping each log message of the plurality of log messages to a message structure. The message structure may define a fixed portion or a variable portion of the message data as a data field. The method may include detecting, for each log message of the plurality of log messages, one or more data fields within the message data based at least in part on the one or more detectable signatures included in the message data and the mapping of the log message to the message structure. Each data field of the one or more data fields corresponds to a value present in the message data of the log message. The method may also include receiving, via a user interface, input corresponding to a query string for querying at least a portion of the plurality of log messages. The query string may include one or more virtual data fields. Each of the one or more virtual data fields may correspond to a function of at least one data field of the detected one or more data fields. The one or more virtual data fields may not be present in the detected one or more data fields or the message structure. The method may include parsing the query string to identify each of the one or more virtual data fields, and in response to the parsing, constructing a response to the query string at least in part by: querying one or more log data stores using the at least one data field, wherein the plurality of log messages are stored across the one or more log data stores; receiving, for each of the one or more log data stores, partial result data in response to the querying of the log data store, the partial result data including one or more results of querying log messages stored at the log data store; aggregating the partial result data received from each of the one or more log data stores to determine a preliminary result for the at least one data field; and performing the function on the preliminary result to determine a constructed response to the query string that included the one or more virtual data fields. The method may also include generating a log field view representing the constructed response to the query string, and presenting, at the user interface, the log field view. The constructed response to the query string may present the preliminary result.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

Advantageously, embodiments of the present disclosure address the limitations of certain platforms, in that a distributed processing layer (e.g., the query layer) can be built to enable users to perform complex queries on log messages stored across a plurality of log endpoints. Further, users can construct query strings that reference virtual fields by defining the virtual field as a function or expression of one or more existing data fields included in the log messages. The function or expression of the virtual field can be performed at runtime, regardless of the formats of the various log messages. Data parsers can be used to parse the log messages to identify the data fields included in the query string, even if the data field in one log message is in a different location as the same data field in another log message. Additionally, the query string can be transformed into a JSON data structure so that the query string is optimized for execution at the back-end servers.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
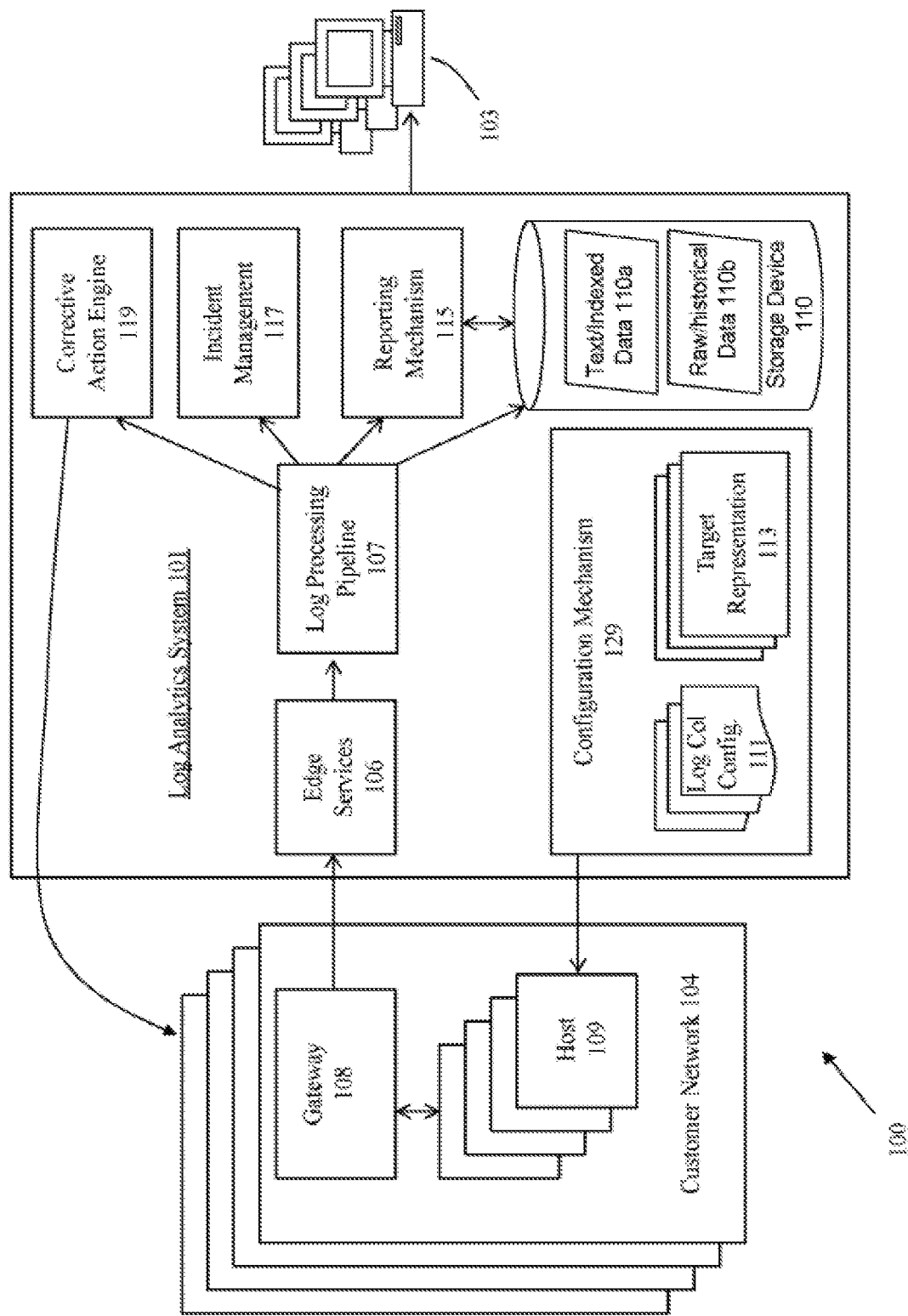
FIG. 1A illustrates an example system for configuring, collecting, and analyzing log data, according to certain embodiments.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
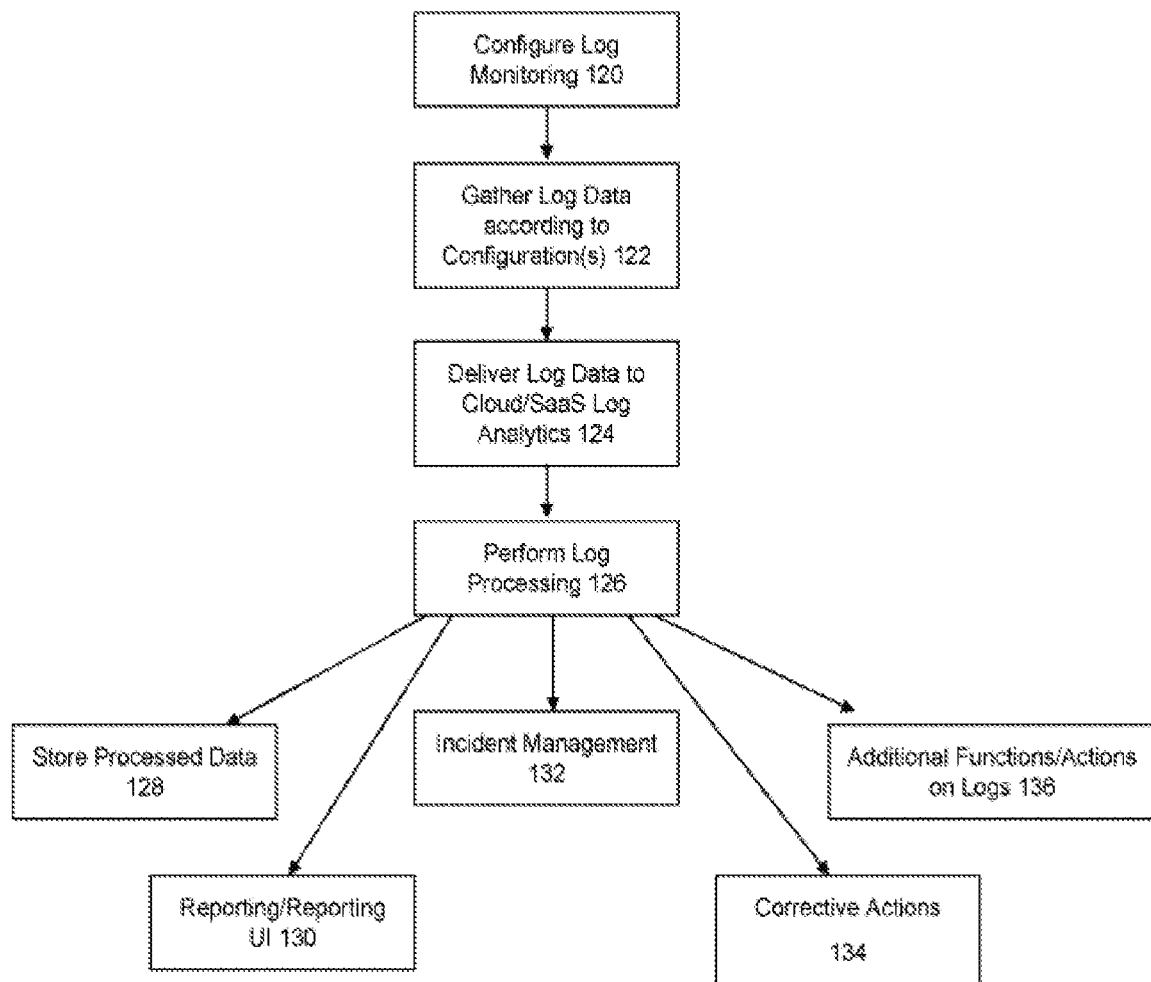
FIG. 1B shows a flowchart of an approach to use a system to configure, collect, and analyze log data, according to certain embodiments.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
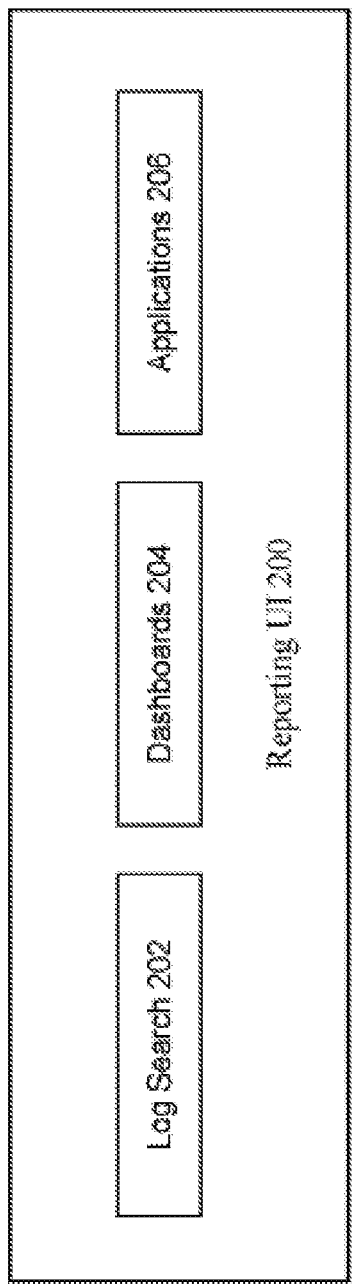
FIG. 2 is a block diagram illustrating components of a reporting user interface (UI), according to certain embodiments.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
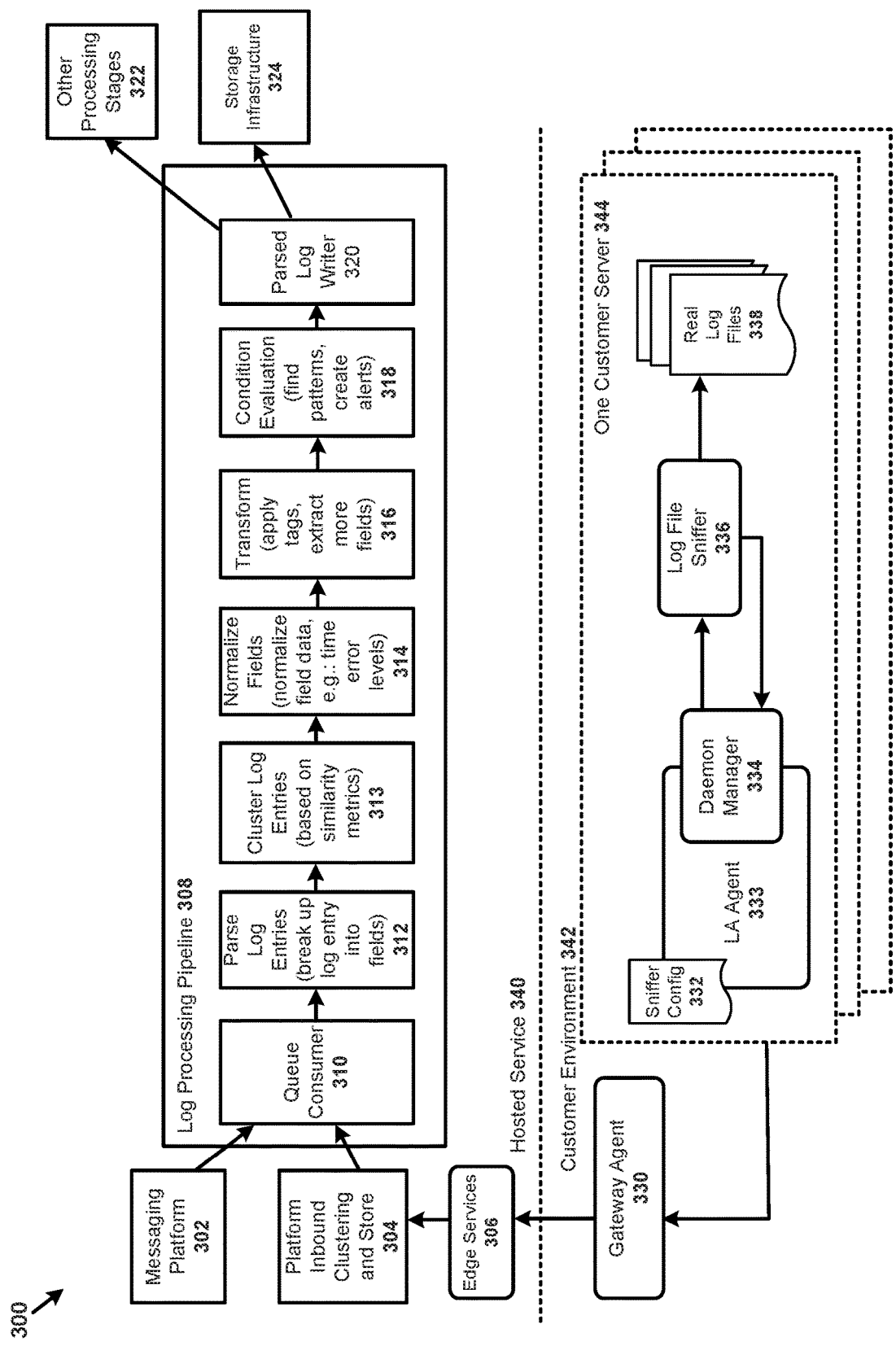
FIG. 3A is a block diagram illustrating an example internal structure of the log analytics system, according to certain embodiments.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/ customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
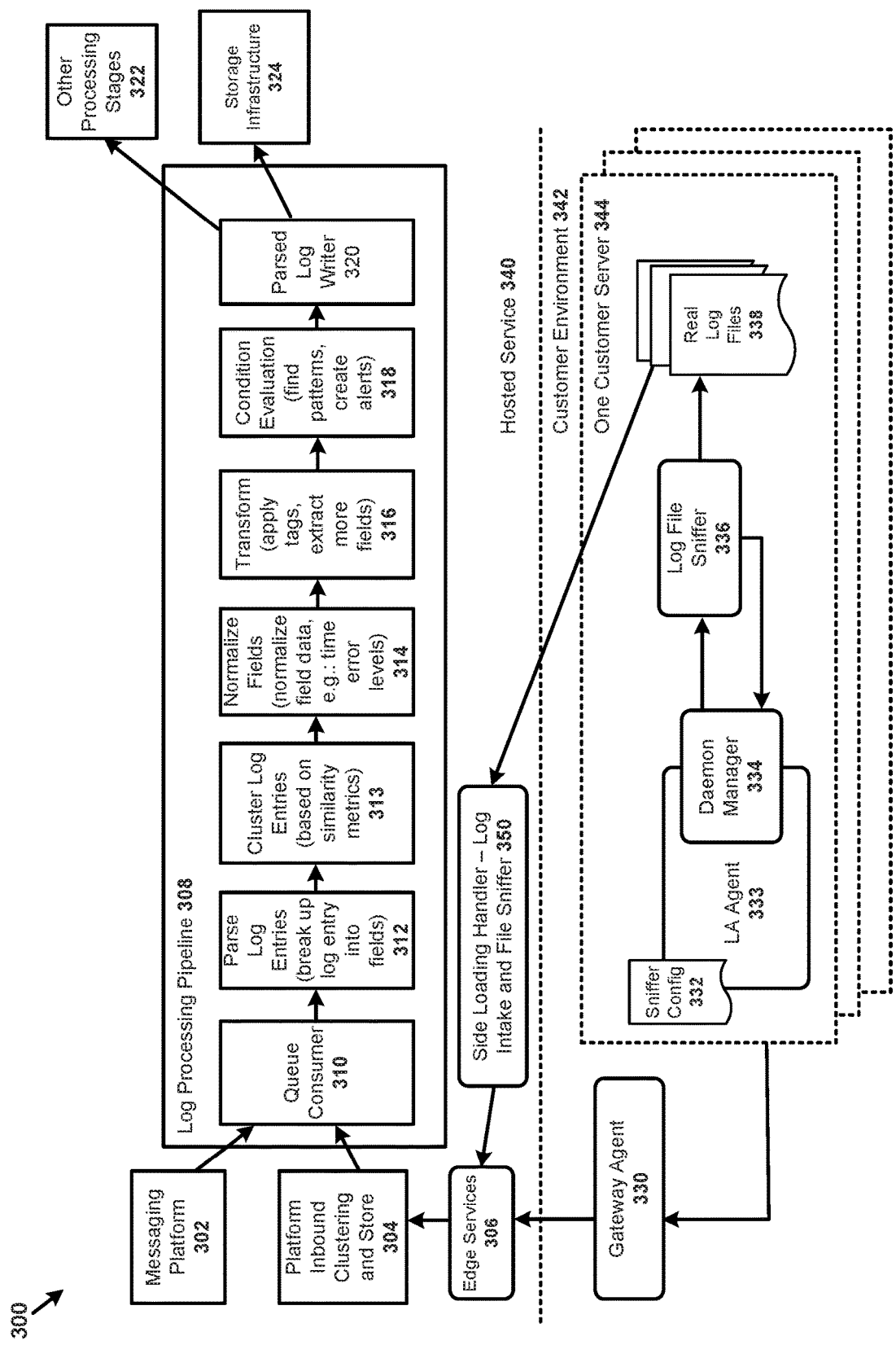
FIG. 3B is a block diagram illustrating an example internal structure of the log analytics system, according to other embodiments.
Figure 3C:
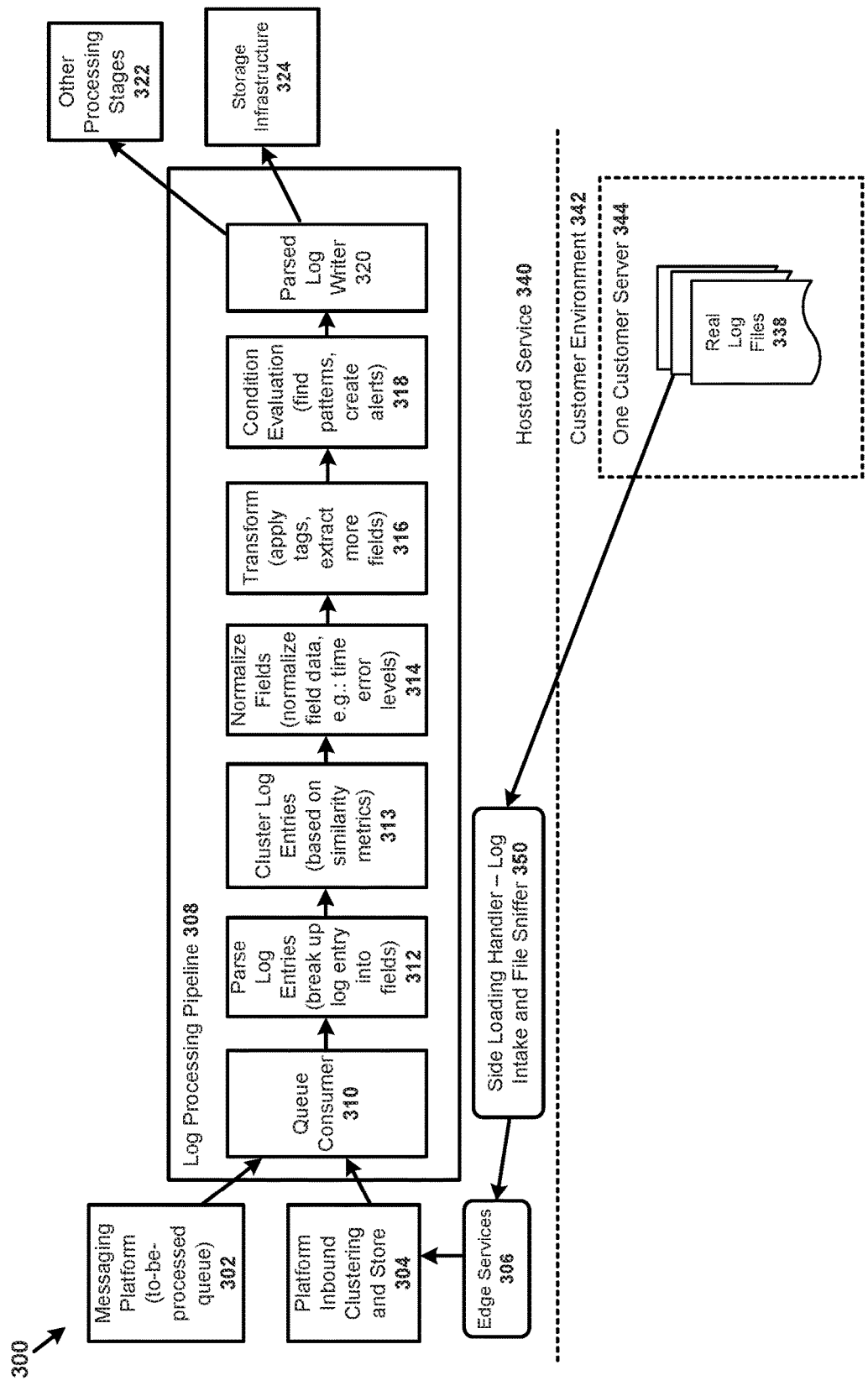
FIG. 3C is a block diagram illustrating an example internal structure of the log analytics system, according to other embodiments.

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/ sniffer entities are either not installed and/or not needed on the client server 344.

According to aspects of the present disclosure, a distributed processing layer can be provided that enables users to perform complex log analytics on log messages that are stored across several log endpoints. The distributed processing layer (e.g., a query layer) can enable a user to define a query string that references virtual fields (e.g., fields that are not included in log messages), and to perform operations with the virtual fields. As a non-limiting example, a query string can include a group-by operation with respect to a user ID and request a "transfer ratio" for each user ID. In this example, the "transfer ratio" can be a virtual field that is not included as a field in a message skeleton of a log message. The query string can define the "transfer ratio" as a function of "bytes out"/"bytes in" where each of "bytes out" and "bytes in" are fields included the message skeleton of a log message. For example, the group-by operation may be performed on aggregated partial result data using one or more virtual fields. Performing the group-by operation may include grouping log messages of the plurality of log messages into one or more groups. Log messages included in a group share a same attribute with other log messages in the group. For example, an attribute may correspond to a value within a data field of the log message. In this example, if two log messages have the same username in the "username" data field, then the two log messages share an attribute, and thus, may be grouped, if the group-by operation is defined to group by usernames. As a further example, the query string can additionally include a virtual field of "application profile," which is defined as a particular profile for the group of log messages that have "transfer ratios" above a defined threshold, and is defined as another profile for the group of log messages that have "transfer ratios" below the defined threshold. In this example, the "application profile" referenced in the query string was defined on the fly by the user, and the "application profile" is not included as text in log messages (e.g., as a data field of a log message).

Figure 4:
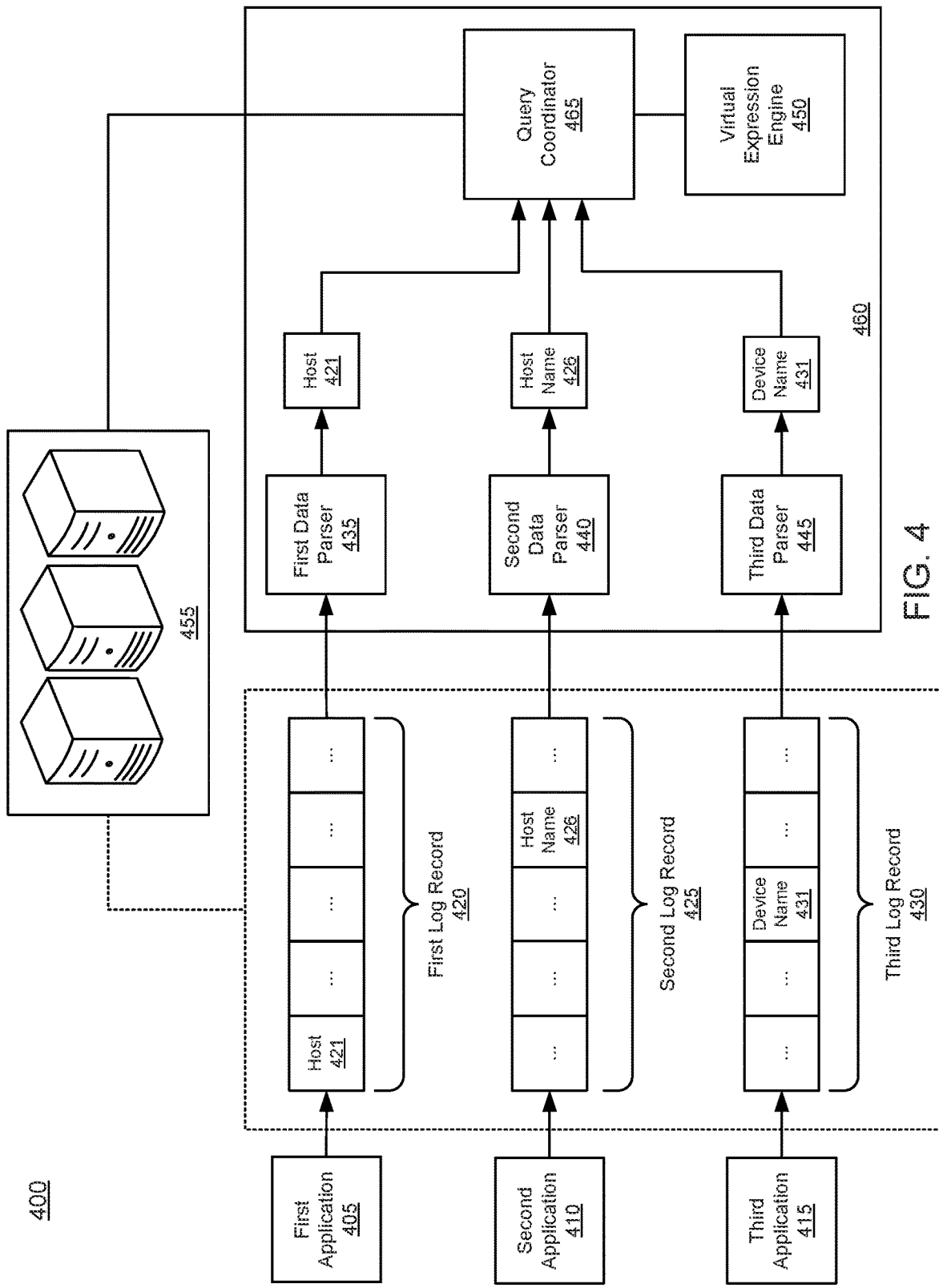
FIG. 4 is a simplified block diagram illustrating network environment for implementing distributed querying using query strings in which virtual fields may be defined, according to certain embodiments.

FIG. 4 is a simplified block diagram illustrating network environment 400 for implementing distributed querying using query strings in which virtual fields may be defined. In the illustrated embodiment, network environment 400 includes multiple log endpoints 455. Log endpoints 455 includes a plurality of log endpoints that are configured to store log messages (also referred to as log records herein). Log endpoints 455 may store first log record 420, second log record 425, and third log record 430. As illustrated in FIG. 4, first log record 420 may be generated or recorded as a result of the operation of first application 405, second log record 325 may be generated or recorded as a result of the operation of second application 410, and third log record 430 may be generated or recorded as a result of the operation of third application 415. It should be appreciated that each of first log record 420, second log record 425, and third log record 430 may be generated by any application or the same application. It should also be appreciated that each of first log record 420, second log record 425, and third log record 430 may be generated as part of the same or different transactions.

It should be appreciated that network environment 400 illustrated in FIG. 4 may have other components than those illustrated in FIG. 4. Further, the embodiment shown in FIG. 4 is only one example of a network environment that may incorporate an embodiment of the present disclosure. In some other embodiments, network environment 400 may have more or fewer components than shown in FIG. 4, may combine two or more components, or may have a different configuration or arrangement of components.

Each of first log record 420, second log record 425, and third log record 430 may correspond to a message skeleton. For example, a message skeleton of a log record may include one or more signatures (e.g., predefined code or a flag) that can be automatically detected by a data parser and/or the query layer. When a signature is automatically detected, the data parser and/or the query layer may identify that a data field exists at the location of the detected signature. Further, the data parser and/or the query layer can identify which data field exists in the log record based on the location within the string of code and the detected signature. In some implementations, the message skeleton can include fixed portions and/or variable portions. The variable portions may have certain data types based on their position in the log message and/or their value patterns, such as IP addresses, server names, URLs, etc. Based on this analysis, type information for the two or more log messages can be stored. For example, type information can include one or more data fields. Examples of data fields can include host IP address, content size in, content size out, source port, timestamp of recording the log message, protocol used for the log message (e.g., TCP), a process name associated with the process flow of the log message, and other suitable data fields. Each data field of the one or more data fields can correspond to a value present in a corresponding log message. Examples of values of the data field include the value of the host IP address for a particular log message or the timestamp of the particular log message. It will be appreciated that data fields represented by the type information are not necessarily part of the log messages themselves. The data fields may be embedded into the message, the message may be mapped to a set of types, or a separate table may be stored that represents the field values for the message. In one embodiment, the type information is gleaned by matching at least a portion of a log message to a known pattern. The known pattern is associated with a type of variable, and type information is stored such that the message does not need to be parsed again and matched against the pattern again in order to determine that the message contains a variable of the detected type. In one embodiment, the log message includes several portions of text, and a first subset of portions of text is detected as one or more variables of one or more corresponding types while a second subset of portions of text is not detected as a variable of a known type. In this embodiment, the type information might include information about the first subset without including information about the second subset.

To illustrated and only as a non-limiting example, each of first log record 420, second log record 425, and third log record 430 may include the same data field, but this data field may be located within different portions relative to the other log records. Further, the same data field may be represented by different words and/or by different formats. For example, a data field may correspond to a "hostname," which may represent data identifying a device connected to a network. As shown in FIG. 4, the data field "hostname" may be represented by three different words or phrases, such as, for example, the words or phrases "Host," "Host Name," and "Device Name." First log record 420 may comprise several data fields, including Host 421. Second log record 425 may comprise several data fields, including Host Name 426. Third log record may comprise several data fields, including Device Name 431. Each of Host 421, Host Name 426, and Device Name 431 may be different words for representing the same data field (i.e., "hostname"). Further, as shown in FIG. 4, Host 421 of first log record 420 is positioned at a different location than Host Name 426 of second log record 425 and Device Name 431 of third log record 430, and vice versa.

In some implementations, network environment 400 may include query layer 460. Query layer 460 may include a plurality of data parsers configured to parse through log records to locate and identify particular data fields. For example, a data parser may be configured to examine the string of data included in a log record to search for a particular data field (e.g., to search the log data for signatures representing a particular data field). Further, a given data field may correspond to one or more data parsers because the data field may be represented differently in different log records. As shown in FIG. 4, first data parser 435 may be configured to parse log records for data fields named "Host." Second data parser 440 may be configured to parse log records for data fields named "Host Name." Third data parser 445 may be configured to parse log records for data fields named "Device Name." The result of parsing the log records may be passed from the data parser to query coordinator 465.

In some implementations, a virtual data field may be based on a start of a transaction or an end of a transaction. The transaction may correspond to a transaction identifier. Further, the transaction identifier may be a detectable field in a log message, and the start and/or the end of the transaction may be computed based on a set of log messages associated with the transaction. In some implementations, log messages may be grouped by virtual fields that do not exist in log messages. Further, the virtual fields may be defined within the query string, so that a function involving data fields that do exist within the log messages (corresponding to the virtual field) is executed at runtime.

In some implementations, query coordinator 465 may be configured to execute the query string that queries the multiple log endpoints 455. For example, query coordinator 465 can generate the query string, which includes virtual data fields that are defined within the query string itself. The query string can be transformed in a data structure (e.g., a JSON data structure) and shipped to log endpoints 455 to complete the query. Further, query layer 460 may include virtual expression engine 450, which identifies and stores the functions or expressions of the virtual fields included within the user-defined query string. For example, the functions or expressions of the virtual fields may be functions or expressions of existing data fields. For example, the function or expression of a virtual field named "transfer ratio" may be a function of "bytes in"/"bytes out," where "bytes in" and "bytes out" are each data fields existing within log messages and where "transfer ratio" is not a data field that exists in the log messages.

Advantageously, query coordinator 465 may query log endpoints 455 based on user-defined query strings that include virtual data fields, which are not included within log messages. As a further advantage, querying log endpoints 455 may be performed, regardless of the various formats of the log records at log endpoints 455 because data parsers can be used to evaluate the different log records.

Figure 5:
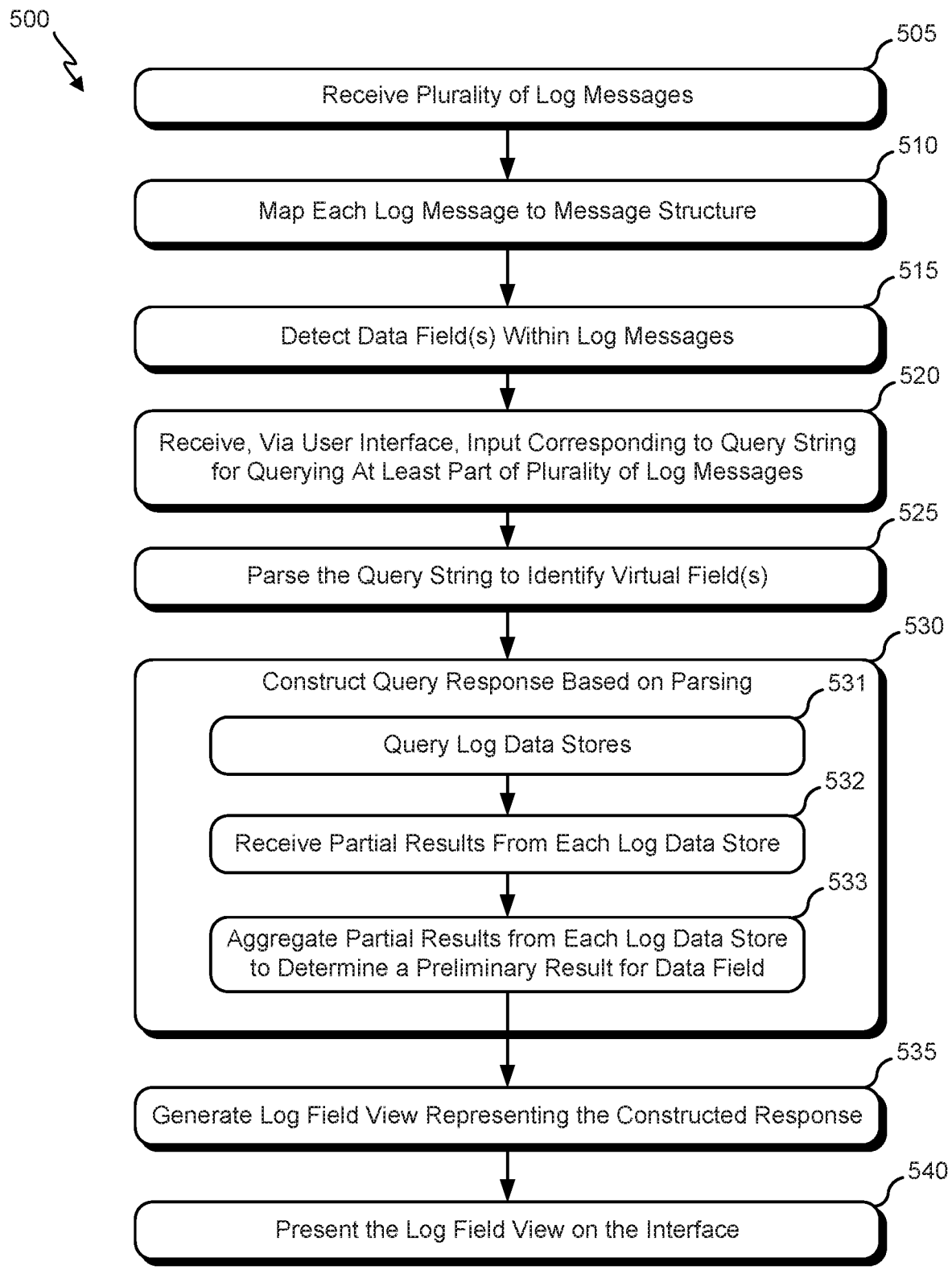
FIG. 5 is a flowchart illustrating an example process for querying log endpoints using query strings that reference virtual fields, according to certain embodiments.

FIG. 5 is a flowchart illustrating an example process 500 for querying log endpoints using query strings that reference virtual fields, regardless of the format of log messages. Process 500 can be performed at least in part any of a user interface layer, a query layer, or a log endpoint. Further, process 500 can be performed to provide an interface that enable users to define query strings that reference virtual fields, which are not included as fields in message skeletons and/or data fields of log messages. Process 500 begins at block 505 where a plurality of log messages is received, for example, at one or more log endpoints (e.g., log cores). For example, a log endpoint can store millions of log messages representing transactions that occurred during process or transactional flows (e.g., a user going through a transaction with one or more steps, such that at each step a log message is recorded at one of the log endpoints). In some examples, the log messages associated with a particular transaction or process flow can be stored across several log endpoints on a time-range basis. In these examples, all log messages recorded during a first time period can be stored at a first log endpoint, all log messages recorded during a second time period can be stored at a second log endpoint, and so on. In other examples, the log messages associated with a particular transaction or process flow can be stored across several log endpoints on a server interaction basis. In these examples, all log messages recorded based on a user device's interaction with a first server can be stored at a first log endpoint, all log messages recorded based on a user device's interaction with a second server can be stored at a second log endpoint, and so on.

At block 510, one or more log messages stored at the log endpoints can be mapped to a message structure (e.g., a message skeleton). In some implementations, mapping of the log messages to one or more message structures can include analyzing one or more log messages from amongst the plurality of log messages. For example, analyzing a log message can include mapping of the log message to a message skeleton. The message skeleton is described above in the description of FIG. 4, and thus, is omitted here for the sake of brevity. Mapping a log message to a message skeleton may result in a log message for which the string of data included in the log message is segmented in one or more identifiable data fields. Each of the one or more identifiable data fields include one or more values that represent an attribute or parameter of the interaction that is the basis of the log message. For example, the log message may be recorded when a user device interacts with a server to provide login credentials to access the server. After analyzing the log message by mapping the string of data in the log message to a message structure, the log message may be determined to comprise a data field that includes a value representing the IP address associated with the user device and another data field that includes a value representing the timestamp of the interaction.

At block 515, data fields within one or more log messages can be detected. For example, after mapping a log message to a message structure, as in block 510, the data fields within the log message can be detected. In some implementations, the data fields can be detected based on a signature within the log message and a location of the signature within the string of data included in the log message. For instance, the "hostname" data field may be known (e.g., based on domain knowledge) to be included as the first data field within a log message. Accordingly, detecting the "hostname" data field within a log message may include detecting the signature (e.g., a defined code or flag) as the first signature within the log message indicating that the signature corresponds to the first data field within the log message.

At block 520, input can be received at a query layer via a user interface. The input can correspond to a query string for querying at least part of the plurality of log messages. For example, a user can enter or otherwise define a query string via the user interface (for non-limiting examples of the interface see FIG. 7A). In some examples, the query string can reference a virtual data field. As described above, a virtual data field is not included in the type information as a data field or as text in the original log messages. A virtual data field can be defined in the query string as a function of at least one data field of the one or more data fields within log messages. As a non-limiting example, a virtual field of "transfer ratio" can be defined within the query string as "bytes in"/"bytes out," such that "bytes in" and "bytes out" are each data fields of a log message, and such that "transfer ratio" is not a data field in the log messages. The one or more virtual data fields may not be present as text in (at least part of) the plurality of log messages or in the type information corresponding to the plurality of log messages. In some cases, in addition to any arithmetic operations to define virtual fields, the virtual fields can be defined through extracting and concatenating a string from the log messages. For example, a virtual field can be defined as such: 'extract ("Ip Address", "/^(\d+)\.\d+\.\d+\.\d+$/")' as "Ip Prefix". In some cases, a virtual field can be defined by concatenating two extracted strings from the log message. Further, a virtual field can be created as a string field, as well as a numeric field.

In some implementations, the interface can be configured to display a plurality of existing data fields detected in log messages. Each existing data field can be represented by a selectable and movable object (e.g., a displayed box that represents an existing data field) presented on the interface. The interface can receive input corresponding to a selection of a displayed object. The interface can also receive input corresponding to a drag-and-drop operation of the object from one location on the interface to another. The location to which the object was moved may correspond to an area of the screen configured to build the query string. To illustrate, a box representing a "hostname" data field can be displayed on the left side of the interface. The interface can be configured to receive input corresponding to a drag-and-drop operation performed by the user, such that the object representing the "hostname" is moved into the area of the interface for building the query string. In this example, the query string is defined to include at least the "hostname" data field.

In some implementations, a user can define a query string via the interface, such that the query string references a virtual field that the user defined within the query string. For instance, the user can define the virtual field within the query string by defining a field name for the virtual field and referencing a function of one or more existing data fields (e.g., data fields that are included in the log messages themselves or included in the type information of the log messages). Advantageously, the virtual field names can be defined "on the fly" by the user, and the operations can be performed, such as a group-by operation, using the virtual field names. Further, it will be appreciated that the query string can be submitted through the user interface layer and received at the query layer.

At block 525, the query string can be parsed to identify each of the one or more virtual data fields that are referenced in the query string. In some examples, parsing can be performed at the user interface layer, and in other examples, parsing can be performed at the query layer. Further, parsing can be performed to identify the components of the query string. Since users can define a query string including functions (e.g., a function in an EVAL operation) and/or operations (e.g., a group-by operation) in any order, the query string can be parsed to identify which functions and/or operations are included in the query string. The query string can also be parsed to detect any virtual field or virtual field names that are referenced in the query string. In some examples, the query layer can invoke a LogAnalyzer to perform the functions defined by the virtual field (e.g., the function of dividing "bytes in" by "bytes out" for the virtual field of "transfer ratio" as described above). The LogAnalyzer and/or the query layer itself can send the queries to the one or more log endpoints and store the partial results received from each log endpoint, as will be described in further detail herein.

At block 530, in response to the parsing, a response to the query string can be constructed at the query layer. Constructing the response can include at least blocks 531, 532, and 533. At block 531, each of the one or more log data stores (e.g., log endpoints) can be queried using the data fields included in the query string. For example, if the virtual field name in the query string is "transfer ratio" and is defined as "bytes in" divided by "bytes out," then the query layer can perform a query including one or more operations for each of the log endpoints using the "bytes in" and "bytes out" data fields. For the purpose of illustration, if there were three log endpoints (e.g., first through third log endpoints), the first log endpoint may correspond to a first time period, the second log endpoint may correspond to a second time period, and the third log endpoint may correspond to a third time period. In this illustration, the query layer may query each of the first through third log endpoints for log records (e.g., in some cases, for a count of log records, and as such, not the log records themselves) using each of the "bytes in" and "bytes out" fields. In this example illustration, if the query string includes the operation of group-by "user ID" for "transfer ratio" defined as "bytes in" divided by "bytes out," then the query layer will query each of the three log endpoints for the values included in the data fields of each of the "bytes in" data field and "bytes out" data field for each queried log message, and group the results by user ID. Advantageously, the user can define complex queries using virtual fields even if the log messages relevant for the queries are stored across several log endpoints. As a further advantage, the complex queries can be executed on top of the log messages stored across the log endpoints, even if the stored log messages include several groups of log messages, such that each group of log messages is in a different format from the log messages included in the other groups of log messages. The data parsers can parse the log messages to extract a data field, even if the data field is represented by different words across log messages.

At block 532, a partial result (e.g., partial result data) can be received from each of the one or more log data stores. As described above, the partial result can be a result of querying a particular log endpoint. For instance, a query performed on the first log endpoint is a query of log messages recorded during the first time period. Querying each of the log endpoints allows for a distributed processing of the query string. When the partial result data is received at the query layer from each of the log endpoints, the partial result data can be temporarily (e.g., for 30 days) or permanently stored. Again using the illustration above, an example of partial result data can include a result of the total number of "bytes in" and a total number of "bytes out" for each user ID included in the plurality of log messages stored at the log endpoint.

At block 533, the partial result data received from each of the log data stores can be aggregated. In some cases, the partial result data can be aggregated to determine a preliminary result for the data field. Further, a function can be performed on the preliminary result to determine a constructed response to the query string that referenced the one or more virtual data fields. The function can correspond to one or more functions/operations referenced in the query string within the user-defined virtual field. Further, the function on the partial results can be performed by the query layer (e.g., a coordinator). In some cases, the query layer can determine whether the preliminary result satisfies one or more conditions. If the one or more conditions are satisfied, then the query layer can determine whether to communicate with other sources based on whether or not the conditions were satisfied. For example, the query layer can determine whether the preliminary result (e.g., a total sum of bytes) is above a threshold. In this example, if the preliminary result is above a threshold, then the query layer can query the log endpoints again with additional queries. If the preliminary result is not above the threshold, then the query layer can transmit the preliminary result back to the interface layer. In some cases, the query layer (e.g., the coordinator) can be associated with a Uniform Resource Identifier (URI) at a network location, which includes instructions to process the queries and temporarily store the results.

At block 535, a log field view can be generated for the interface. The log field view can represent the constructed response to the query string. In some implementations, the constructed response to the query string can present aggregate information for two or more log messages. The two or more log messages can be grouped based on criteria expressed in the query string. For example, the criteria for a group-by operation can be a "user ID" field name as described above. As a result, two or more distinct values can be presented for the virtual data fields included in the query. Examples of the distinct values can include distinct aggregated values when the query is grouped by another data field or distinct values when the query is grouped by the virtual data field, where one or more aggregate values for one or more other data fields are provided in the latter scenario. At block 540, the log field view can be presented at the interface. The log field view may be interactive so as to enable the user to select one or more log messages displayed in the log field view and explore additional data about the selected log messages. Non-limiting examples of log field views are illustrated in FIGS. 7B and 7C.

It will be appreciated that presenting the log field view at the interface can include presenting a table including each of the one or more virtual data fields. In this example, the table can be considered as an output of the query string after the query string is executed at each of the log endpoints. Each virtual data field in the table can include data elements, and each data element can include a value. The value included in the data element can be or can correspond to a result of executing the query string for a particular log message of the plurality of log messages stored in a log endpoint. Using the examples described above, if the query string included a group-by operation to group query results by "user ID" and evaluate (e.g., using "EVAL") the "transfer ratio" for each "user ID," the table presented after the query is executed can include a plurality of data elements. At least some of the data elements can include the result of calculating "transfer ratio" (e.g., "bytes in" divided by "bytes out") for each of the unique user IDs included in the log messages.

It will also be appreciated that additional user input can be received at the interface. For example, the additional user input can correspond to a selection of a virtual data element from amongst the one or more virtual data fields presented in the table. In this example, a user can select a data element to drill down (e.g., evaluate further, gain greater insight, access additional details of the identified log messages) on the underlying log messages associated with that data element in the table. The underlying log messages for a data element may be the log messages that were the basis of the result of the value included in that particular data element. After a data element is selected, the interface can facilitate identifying at least one log message that is associated with the selected virtual data field. Information describing additional aspects, characteristics, or additional data of the at least one log message can be presented on the log field view to the user to view.

Figure 6:
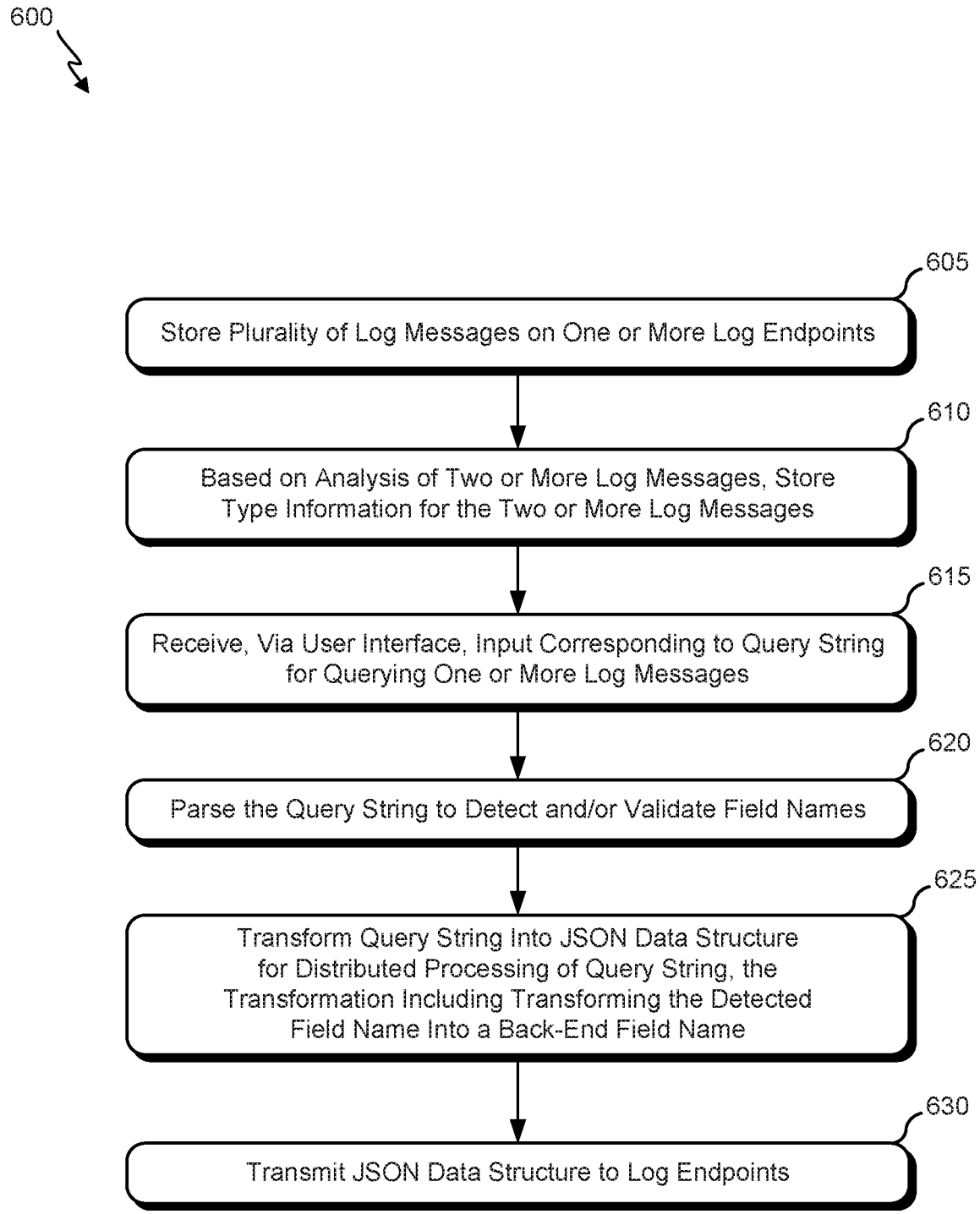
FIG. 6 is a flowchart illustrating an example process for querying log endpoints using query strings that reference virtual fields, according to other embodiments.

FIG. 6 is a flow chart illustrating a process for transforming a query string into a JSON data structure to optimize execution of the query string. Process 600 can be performed at a query layer. In process 600, block 605 corresponds to block 505 of FIG. 5 and block 610 corresponds to block 510 of FIG. 5. At block 615, an interface can be presented to the user to enable the user to execute operations involving log messages stored across a plurality of log endpoints. Input can be received via the interface. For example, the input can correspond to a query string for querying the one or more log messages. Further, the input can define the query string. In some examples, the user can drag-and-drop fields into a box on the interface to generate the query string. In other examples, the user can select various fields and operations for defining the components of the query string using drop down menus. In still further examples, the user can enter the query string into a box on the interface. The query string entered by the user can be a natural language query string, or the components can be clearly defined by the user when entering the query string via the interface. If the query string is entered in a natural-language format, the interface may perform additional processing to detect the components (e.g., field names and operations, such as group-by) included in the query string. Further, the query string is defined based on the input received at the interface. The input can include at least one data field and/or at least one operation. The at least one data field can be associated with a field name (e.g., "content size in").

At block 620, the query string can be submitted from the interface layer to the query layer, and when the query layer receives the query string, the query layer can parse the query string. Parsing the query string can include detecting and/or validating any field names included in the query string. For example, validating a field name can include validating whether the detected field name is a known-to-the-validation-engine front-end field name that is actually mapped to a back-end field name used by the plurality of log endpoints. Each detected and validated field name is associated with the at least one data field included in the query string.

At block 625, the query layer can transform the query string into a JSON data structure in order to process the query string in a distributed manner. In some examples, transforming the query string can include transforming the detected field name into a back-end field name. A back-end field name can be a string of data (e.g., text, numbers, identifiers, specific code representing a name of a data field, etc.) that is machine-readable and executable by two or more of the plurality of log endpoints. Further, transforming can also include referencing one or more aggregate values that require the two or more of the plurality of log endpoints to retrieve from a query execution coordinator (e.g., running at the query layer) in an intermediate step of executing the JSON data structure.

In some examples, a JSON data structure can include a "type" component (e.g., type=terms), a "field" component (e.g., field=sourceIP), and a "group_filters" component (e.g., group_filters: {type=eval, matched=include, and expression="groupduration>=5000 AND grouprecordcount>=5}). In the group_filters component, the "matched=include" term can mean that if "eval" is true, the group will be included and not filtered. The JSON data structure in this example can be a transformed version of an example query string of "GROUPBY 'Host IP Address (Client)'|Where groupduration>=5 s and grouprecordcount>=5". An example of a query that includes a virtual field (e.g., a field that is constructed based on results of queries using data fields included in log messages or mapped to a message skeleton) can be "GROUPBY 'Host IP Address (Client)'|STATS sum("Content Size in") AS "bytes in", sum("Content Size out") AS "bytes out"|EVAL "transfer ratio"="bytes in"/"bytes out"|EVAL "Application Profile"=if(("transfer ratio">=0 and "transfer ratio"<=2), 'Data Consumer', 'Data Producer'". In this example, at least the field "transfer ratio" can be a virtual field that is constructed after all "bytes in" are computed and all "bytes out" are computed and the "bytes in"/"bytes out" operation is performed. For example, the JSON data structure can include properties that correspond to an array of properties to be computed. In this example, properties have a type. The JSON data structure, when executed at the log endpoint, instructs the log endpoint that the log endpoint is to compute a property of a defined type (e.g., "STAT") using a defined expression. Once the property is created, it should be stored with a defined name. In some cases, a partial query can be a property in the JSON data structure (e.g., a JSON document), and the value of the property can be updated at the query layer mid-query at the log endpoint.

At block 630, the JSON data structure can be shipped (e.g., transmitted) to each of the one or more log endpoints. When the JSON structure is received at a log endpoint, the JSON data structure is executed at the log endpoint. Executing the JSON data structure at the log endpoint causes a query represented by the query string to be performed at the log endpoint. Because the JSON data structure includes transforming the detected and validated field names into back-end field names (executable and simpler to execute at the log endpoint), the query can be performed at the log endpoint using the back-end field name.

It will be appreciated that the JSON shipment to log endpoints can also be based on a time range. In these cases, after block 625, one or more particular log endpoints can be selected for executing the JSON data structure. Selecting the one or more particular log endpoints can be based at least in part on a range of time requested by the JSON data structure (e.g., in some cases, the range of time being included in the query string) and different ranges of time covered by the plurality of log endpoints. As discussed above, each log endpoint may store log messages that were recorded for various process flows during a defined time range. For example, a first log endpoint can store log messages recorded during a first time period, a second log endpoint can store log messages recorded during a second time period, and so on. While particular log endpoints are selected based on a range of time, one or more other particular log endpoints are not selected for executing the JSON data structure. After the one or more particular log endpoints are selected, the JSON data structure can be shipped to the selected particular log endpoints. In some cases, the JSON data structure is not shipped to the other particular log endpoints that were not selected.

It will also be appreciated that transforming the query string into the JSON data structure can include optimizing the query string for execution at the log endpoints. For example, optimizing the query string can include sorting the detected and/or validated one or more field names into an optimized order for execution at the log endpoints. Because the user can enter the query string into the interface, and the components of the query string can be in any order, optimizing the order of the operations and/or data fields can enable a simpler execution at the back-end server (e.g., at a log endpoint).

It will also be appreciated that optimizing the query string (for the purpose of transforming the query string into the JSON data structure) can include converting the query string into a plurality of discrete queries. When the JSON data structure is created, the data structure can include an array of operations to be performed when the data structure is executed. Each element of the array of operations can correspond to one of the plurality of discrete queries. In this example, when the JSON data structure is executed, each of the operations in the array of operations is performed, thereby executing the plurality of discrete queries in the query string.

It will also be appreciated that process 600 can further include a step of receiving, from each of the one or more log endpoints, a partial result in response to the query performed at the log endpoint. The partial result can be a result of the query performed at the log endpoint. The received response to the query executed at a single log endpoint is considered partial because the received response corresponds to a particular time period associated with the log endpoint. A total or complete response to the query occurs when each log endpoint (e.g., within the overall time range defined at the interface by the user) has queried the stored log messages and transmitted a response to the query layer. The log endpoints that will be executing the queries can be determined based on the overall time range defined at the interface by the user. For example, if the overall time range entered by the user at the interface includes the time periods associated with three log endpoints, then each of the three log endpoints will execute the queries. In other words, the query is performed for each time period within the overall time range defined at the user interface. In addition, each partial result received from the one or more end points can be aggregated. The query layer can determine whether the aggregated partial results satisfies a defined condition. The condition can be defined by the user in the query string. For example, the condition can be whether the "transfer ratio" is above a certain threshold, then additional operations can be performed. When the defined condition is satisfied, the query layer performs another query (e.g., or another part of the query) at each of the one or more log endpoints. For example, when the "transfer ratio" is above the threshold, additional queries can be performed on the log messages that are associated with the "transfer ratio" that is above the threshold. These additional queries can already be defined in the query string based on the input received at the interface. In some cases, the additional queries can be performed after a partial result is received from each log endpoint.

It will also be appreciated the JSON data structure can support different types of queries. Examples of types of queries can include querying based on a range of values represented by the field names, queries based on an auto- group-by operation, and queries based on an auto-same-treatment of a named set of field names, and so on.

It will also be appreciated that the query layer can perform clustering after grouping (e.g., if a group-by operation is performed). For example, if the query string includes a group-by operation where the log messages are grouped by IP address and a cluster operation to cluster all of the error message fields in the log messages. In this example, instead of seeing all of the log messages for the IP address, the user can easily view the cluster of error messages on the interface.

Figure 7A:
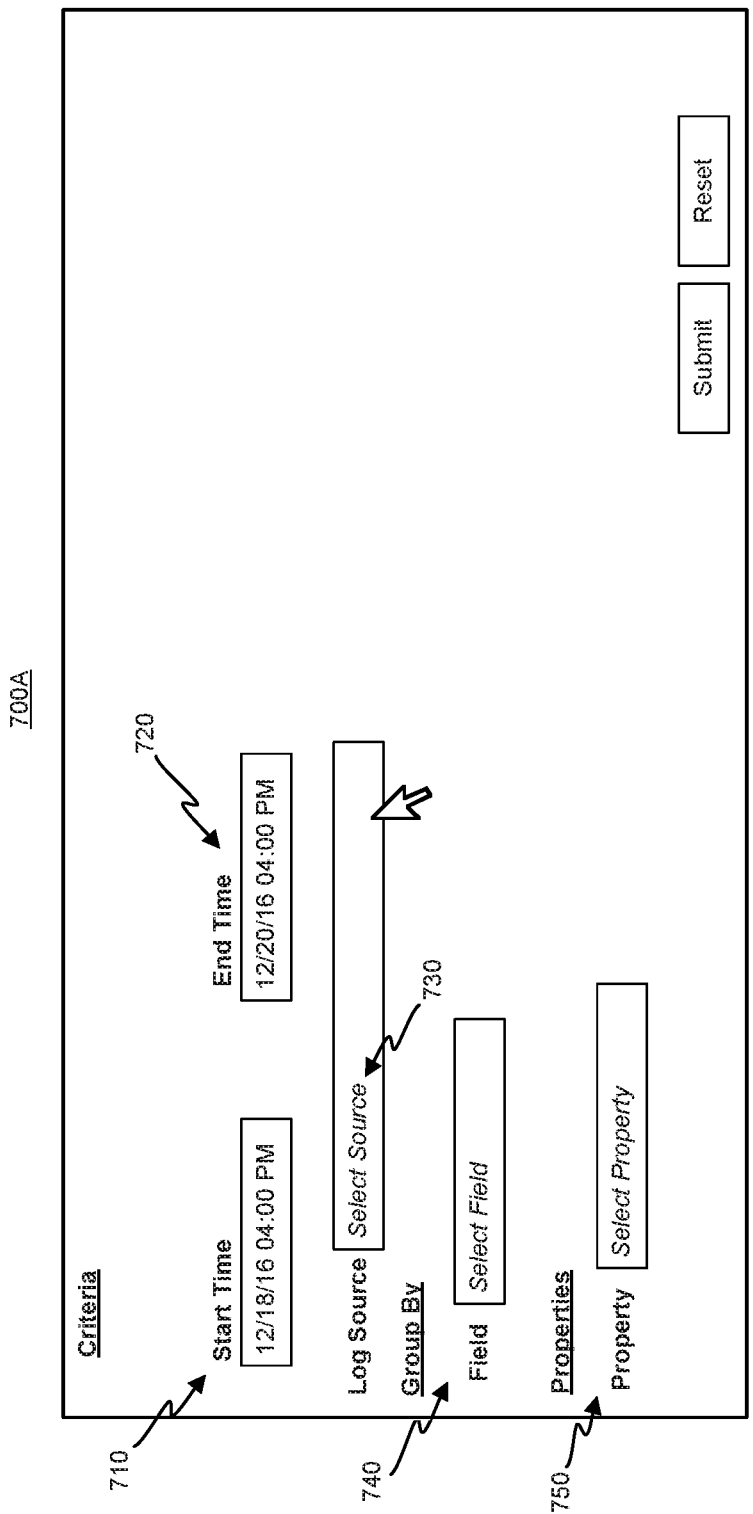
FIGS. 7A-7C illustrate example user interfaces, according to certain embodiments.
Figure 7B:
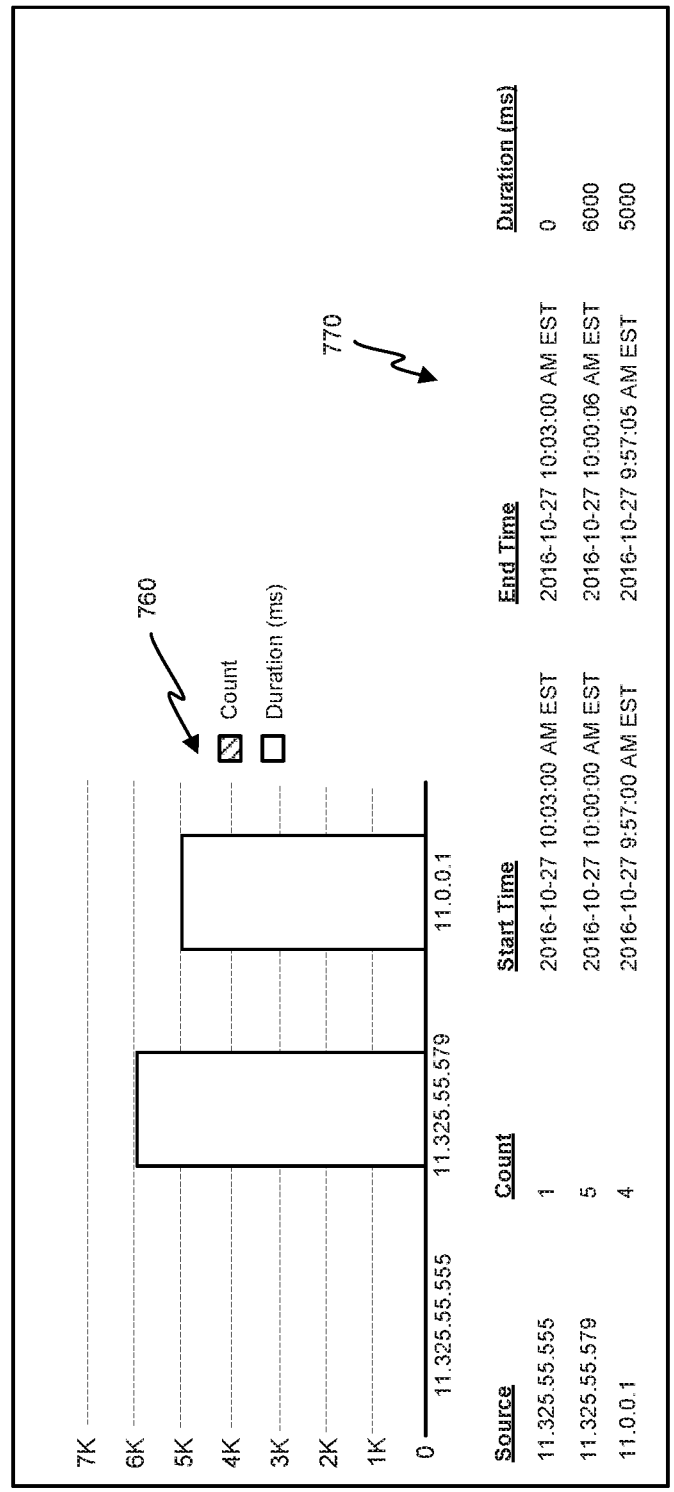
Figure 7C:
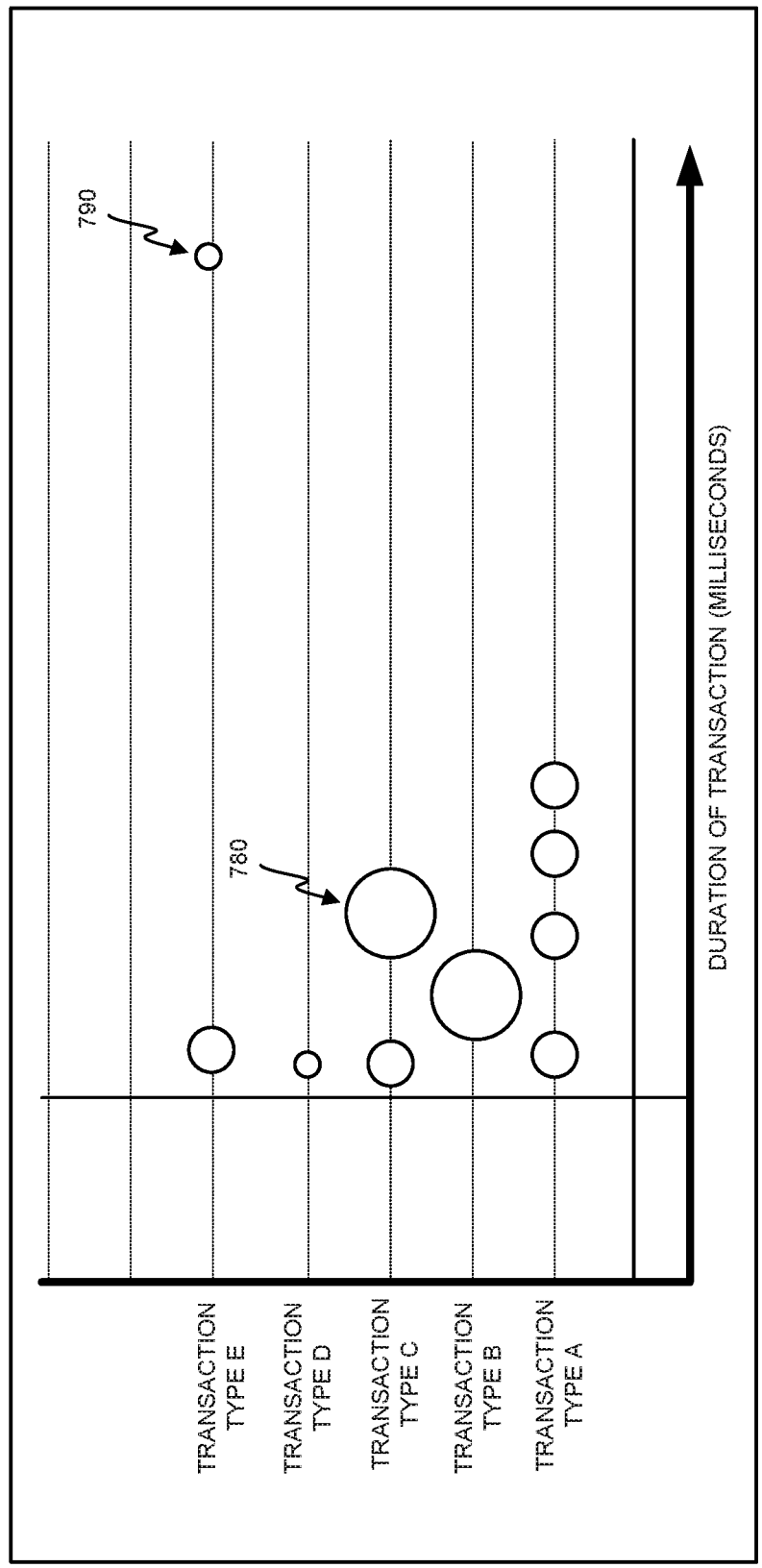

FIG. 7A illustrates an example user interface configured to receive inputs that can be used to define a query string for execution at one or more log endpoints. User interface 700A includes time start input element 710 and time end input element 720. Time start input element 710 can be an input element that is configured to receive user input corresponding to an identification of a start time, which defines the beginning of the overall time range for which log endpoints will be identified. Time end input element 720 can be an input element that is configured to receive use input corresponding to an identification of an end time, which defines the end of the overall time range for which log endpoints will be identified. As illustrated in FIG. 7A, if a start time is defined as "12/18/16 04:00 PM" and an end time is defined as "12/20/16 04:00 PM," then the query layer would identify a set of log endpoints that correspond to time periods within the overall time range of "12/18/16 04:00 PM" to "12/20/16 04:00 PM." For example, a first log endpoint may record log messages from 12/18/16 04:00 PM to 12/19/16 04:00 PM and a second log endpoint may record log messages from 12/19/16 04:00 PM to 12/20/16 04:00 PM. In this example, the query layer, after transforming the query string into a JSON data structure, would transmit the JSON data structure to the each of the first log endpoint and the second log endpoint because each of these log endpoints is within the overall time range. Further, the JSON data structure would be executed at each of the first and second log endpoints. In some examples, other log endpoints that correspond to time periods outside of the overall time range may also be identified for execution of the JSON data structure (e.g., if the time period of the log endpoint is at the fringes of the overall time range).

In addition, user interface 700A can also include input element 730 for identifying a log source. Further, user interface 700A can include input elements 740 that correspond to a group-by operation. For example, users can select fields for performing a group-by operation using input elements 740 (e.g., group-by "user ID" as in the illustrations above). It will be appreciated that user interface 700A can include input elements that correspond to operations other than group-by, and thus, the present disclosure is not limited to the group-by operation. User interface 700A can also include input elements 750 for defining properties of the query string. For example, a user can select the "Property" input element and a drop down menu may be presented. The drop down menu may include functions to be performed in association with the group-by operation. As a non-limiting illustration, the drop down menu can include the STAT property for computing statistics related to the log messages, and the "Function" input element can include a drop down menu, as well, that includes functions, such as minimum, maximum, average, sum, and so on.

FIG. 7B illustrates another example user interface configured to display results of queries defined at user interface 700A. User interface 700B can include a graphical representation of a group-by operation, which grouped log messages within the overall time range by IP address. User interface 700B can include graph 760 and table 770, each of which are a representation of the results of queries defined at user interface 700A. In some cases, in table 770, if a user selects a cell (e.g., the cell including the value of "5" under the column "Count"), then information about the log messages that make up that count of "5" can be displayed. Advantageously, users can drill down on specific log messages by selecting cells on table 770. In some cases, if users define a virtual field in the query string, the virtual field can be injected into table 770 after the queries are executed and the partial results are aggregated at the query layer.

FIG. 7C illustrates another example user interface configured to display results of queries defined at user interface 700A. User interface 700C can include a graphical representation of a group-by operation, which groups log messages within the overall time range by transaction type. The exemplary graph illustrated in FIG. 7C lists different types of transactions recorded in log messages along the Y axis. For example, log messages can correspond to various transaction types, including "Transaction Type A," "Transaction Type B," "Transaction Type C," "Transaction Type D," and "Transaction Type E." Transaction Types A through E may each represent a different transaction that is included in a process flow. The transactions may be between a server and a user device, and these transactions may be recorded in log messages.

For the purpose of illustration and only a non-limiting example, "Transaction Type A" may correspond to a transaction involving creating an account with a server, "Transaction Type B" may correspond to a transaction involving logging into an account using login credentials, "Transaction Type C" may correspond to a transaction involving updating an account, "Transaction Type D" may correspond to a transaction involving updating a contact in an account, and "Transaction Type E" may correspond to a transaction of logging out of an account. In some embodiments, the log messages may automatically be grouped by time ranges of duration (e.g., in milliseconds). For example, the log messages may automatically be grouped into groups of 100 milliseconds (ms) each, such as 0-100 ms; 101-200 ms; 201-300 ms, and so on. In this example, the duration of a transaction for a particular log message determines to which group the log message should belong. Additionally, the duration of a transaction may be represented by a difference between the time (in milliseconds) the transaction starts and the time the transaction ends.

In some embodiments, the graphical representation of user interface 700C may represent different groups of log messages that correspond to a particular transaction type. For example, user interface 700C shows that there are four different groups for "Transaction Type A." The four different groups of "Transaction Type A" represents that the durations of the log messages recorded for "Transaction Type A" can be grouped into four different time groups.

In some implementations, the size of a circle shown on the graphical representation may represent a relative number of log messages included in a group. For example, circle 780 is much larger than circle 790, and thus, the number of log messages represented by circle 780 is much larger than the number of log messages represented by circle 790.

Advantageously, the graphical representation of user interface 700C enables a user to quickly identify an issue within the process flow; a severity of the issue; and additional details of log messages specific to the issue. For example, circle 790 represents that a small number of log messages of "Transaction Type E" have a much longer duration than the other log messages. A user can identify that circle 790 is an outlier, and thus, the log-message group, represented by circle 790, may indicate an issue in the process flow because log messages of "Transaction Type E" should not typically have such a long duration. In some embodiments, the displayed circles (e.g., circle 790) are selectable. Upon receiving input corresponding to a selection of a circle, the interface can identify and display a table, in which each row corresponds to a log message represented by the selected circle. The table may also include additional details recorded in the log messages, such as the hostnames involved in the transaction, the machine name of the server involved in the transaction, and so on.

It will be appreciated that any existing or virtual data field can be used as the Y-axis, and similarly, any existing or virtual data field can be used as the X-axis. For example, the Y-axis may represent each unique user name recorded in the log messages and the X-axis may represent the virtual field of "transfer ratio" (e.g., the existing data field of "bytes out" divided by "bytes in"). Accordingly, the graphical representation (similar to user interface 700C) may the various groupings of "transfer ratios" of unique users, so that the user can identify which users have the highest or lowest "transfer ratios."

Figure 8:
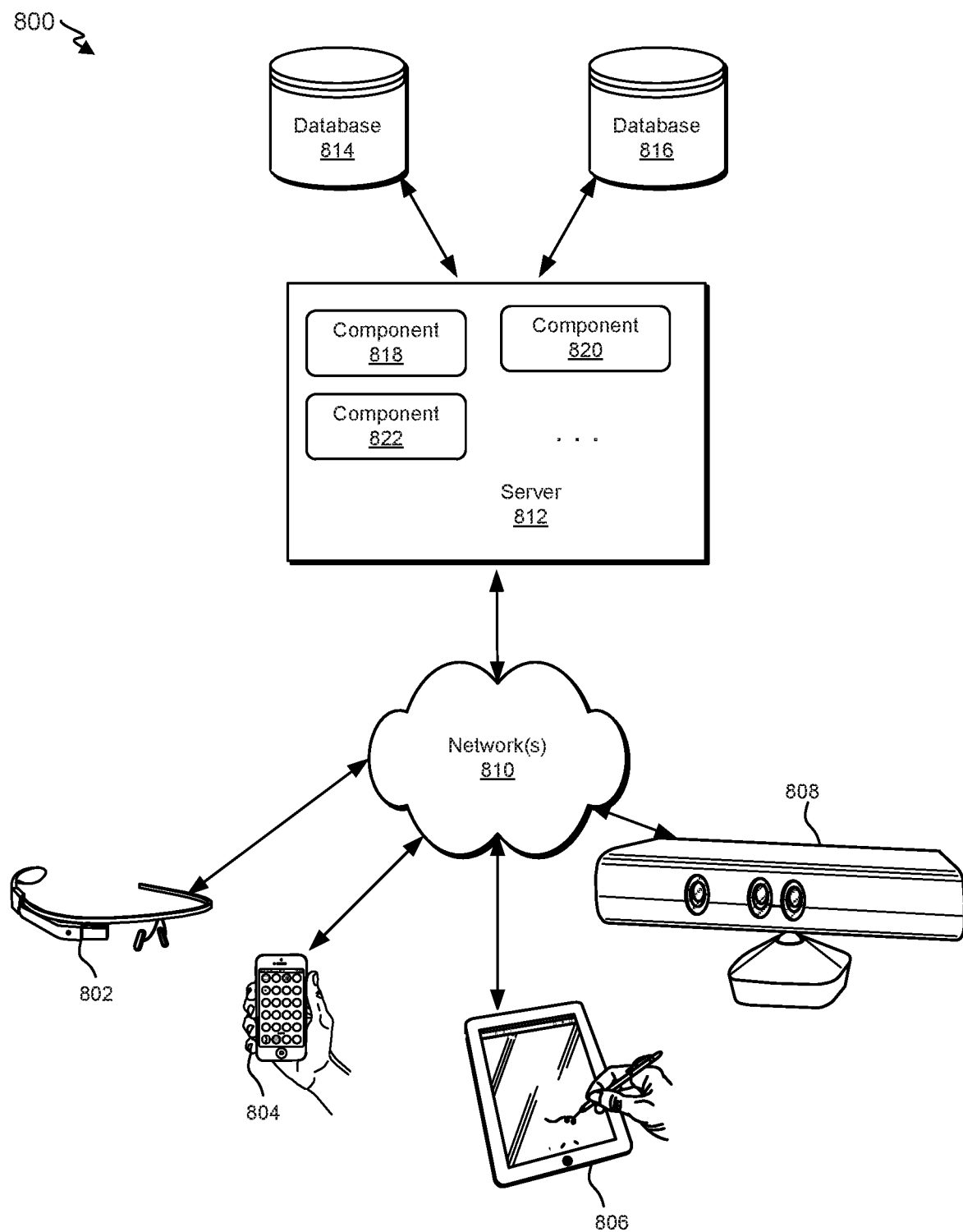
FIG. 8 illustrates a simplified diagram of a distributed system for implementing an embodiment of the present disclosure.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
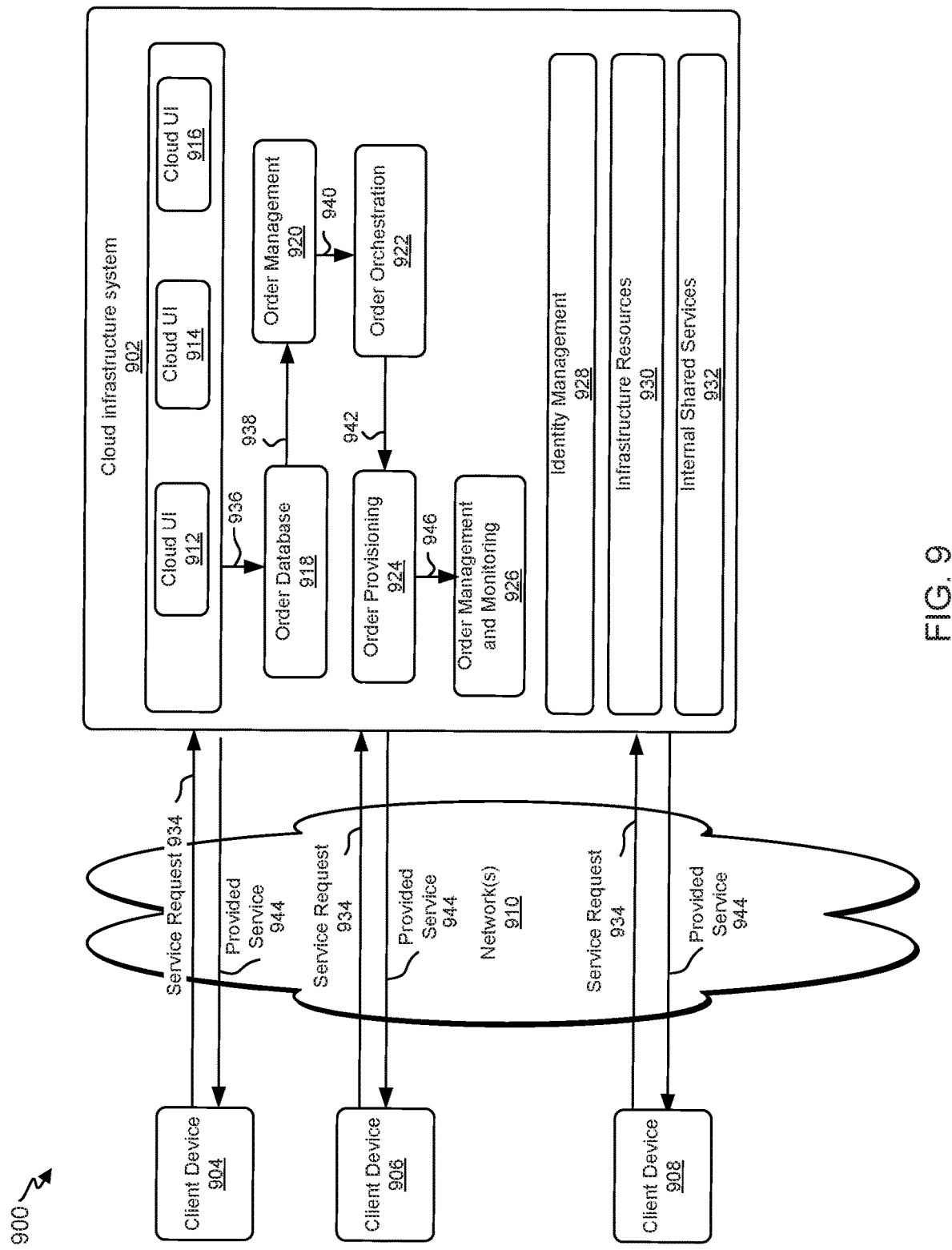
FIG. 9 illustrates a simplified diagram of a distributed system for implementing an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
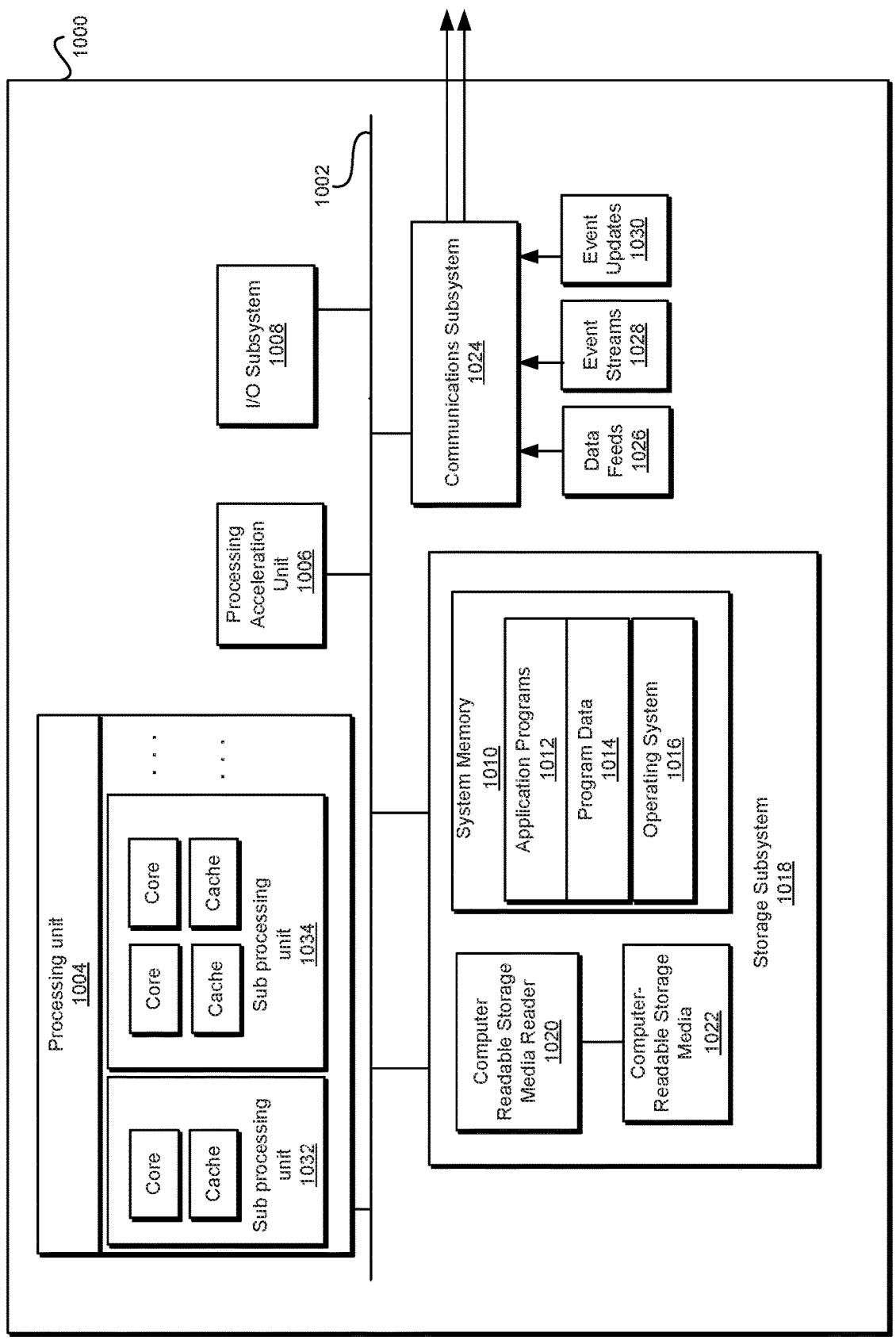
FIG. 10 illustrates an exemplary computer system that may be used to implement an embodiment.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
receiving a plurality of log messages, wherein each log message of the plurality of log messages includes message data, and wherein the message data includes one or more detectable signatures to segment the message data into data fields;
mapping each log message of the plurality of log messages to a message structure, wherein the message structure defines a fixed portion or a variable portion of the message data as a data field;
detecting, for each log message of the plurality of log messages, one or more data fields within the message data, based at least in part on the one or more detectable signatures included in the message data and the mapping of the log message to the message structure, wherein each data field of the one or more data fields corresponds to a value present in the message data;
receiving, via a user interface, input corresponding to a query string for querying at least a portion of the plurality of log messages, the query string including one or more virtual data fields, wherein each of the one or more virtual data fields corresponds to a function of at least one data field of the detected one or more data fields, and wherein the one or more virtual data fields are not present in the detected one or more data fields or the message structure;
parsing the query string to identify each of the one or more virtual data fields;
in response to the parsing, formulating a response to the query string at least in part by:
querying one or more log data stores using the at least one data field, wherein the plurality of log messages are stored at the one or more log data stores,
receiving, for each of the one or more log data stores, partial result data in response to the querying of the log data store, the partial result data including one or more results of querying log messages stored at the log data store,
aggregating the partial result data received from each of the one or more log data stores to determine a preliminary result for the at least one data field, and
performing the function on the preliminary result to determine a formulated response to the query string that included the one or more virtual data fields;
generating a log field view representing the formulated response to the query string, wherein the formulated response to the query string presents the preliminary result; and
presenting, at the user interface, the log field view.

2. The computer-implemented method of claim 1, wherein a virtual data field of the one or more virtual data fields is based on a start of a transaction or an end of the transaction, wherein the transaction corresponds to a transaction identifier, wherein the transaction identifier is a detectable field in a log message of the plurality of log messages, and wherein the start and/or the end of the transaction is computed based on a set of log messages associated with the transaction.

3. The computer-implemented method of claim 1, wherein presenting the log field view at the interface includes presenting a table including each of the one or more virtual data fields, such that each of the one or more virtual data fields includes an associated one or more virtual data elements, and each of the one or more virtual data elements includes a value.

4. The computer-implemented method of claim 3, further comprising:
receiving, at the interface, additional input corresponding to a selection of a virtual data element from amongst the one or more virtual data fields presented in the table; and
identifying at least one log message associated with the selected virtual data element; and
presenting information associated with each of the at least one identified log message.

5. The computer-implemented method of claim 1, further comprising:
performing a group-by operation on the aggregated partial result data using the one or more virtual fields, wherein performing the group-by operation includes grouping log messages of the plurality of log messages into one or more groups, wherein log messages included in a group share a same attribute with other log messages in the group.

6. The computer-implemented method of claim 1, wherein the plurality of log messages includes each of a first log message and a second log message, wherein the first log message is in a first format and the second log message is in a second format, and wherein the first format is different from the second format.

7. The computer-implemented method of claim 6, wherein the first log message includes a particular data field at a first position within the first log message, wherein the second log message includes the particular data field at a second position within the second log message, and wherein the first position is different from the second position.

8. The computer-implemented method of claim 6, wherein the first log message includes a particular data field represented using a first field name within the first log message, wherein the second log message includes the particular data field represented using a second field name within the second log message, and wherein the first field name is different from the second field name.

9. A system, comprising:
one or more data processors; and
a non-transitory computer-readable storage medium containing instructions which, when executed on the one or more data processors, cause the one or more data processors to perform operations including:
receiving a plurality of log messages, wherein each log message of the plurality of log messages includes message data, and wherein the message data includes one or more detectable signatures to segment the message data into data fields;
mapping each log message of the plurality of log messages to a message structure, wherein the message structure defines a fixed portion or a variable portion of the message data as a data field;
detecting, for each log message of the plurality of log messages, one or more data fields within the message data, based at least in part on the one or more detectable signatures included in the message data and the mapping of the log message to the message structure, wherein each data field of the one or more data fields corresponds to a value present in the message data;
receiving, via a user interface, input corresponding to a query string for querying at least a portion of the plurality of log messages, the query string including one or more virtual data fields, wherein each of the one or more virtual data fields corresponds to a function of at least one data field of the detected one or more data fields, and wherein the one or more virtual data fields are not present in the detected one or more data fields or the message structure, parsing the query string to identify each of the one or more virtual data fields;

in response to the parsing, formulating a response to the query string at least in part by:

querying one or more log data stores using the at least one data field, wherein the plurality of log messages are stored at the one or more log data stores, receiving, for each of the one or more log data stores, partial result data in response to the querying of the log data store, the partial result data including one or more results of querying log messages stored at the log data store, aggregating the partial result data received from each of the one or more log data stores to determine a preliminary result for the at least one data field, and performing the function on the preliminary result to determine a formulated response to the query string that included the one or more virtual data fields;

generating a log field view representing the formulated response to the query string, wherein the formulated response to the query string presents the preliminary result; and presenting, at the user interface, the log field view.

10. The system of claim 9, wherein a virtual data field of the one or more virtual data fields is based on a start of a transaction or an end of the transaction, wherein the transaction corresponds to a transaction identifier, wherein the transaction identifier is a detectable field in a log message of the plurality of log messages, and wherein the start and/or the end of the transaction is computed based on a set of log messages associated with the transaction.

11. The system of claim 9, wherein presenting the log field view at the interface includes presenting a table including each of the one or more virtual data fields, such that each of the one or more virtual data fields includes an associated one or more virtual data elements, and each of the one or more virtual data elements includes a value.

12. The system of claim 11, further comprising:

receiving, at the interface, additional input corresponding to a selection of a virtual data element from amongst the one or more virtual data fields presented in the table; and identifying at least one log message associated with the selected virtual data element; and presenting information associated with each of the at least one identified log message.

13. The system of claim 9, wherein the operations further comprise:

performing a group-by operation on the aggregated partial result data using the one or more virtual fields, wherein performing the group-by operation includes grouping log messages of the plurality of log messages into one or more groups, wherein log messages included in a group share a same attribute with other log messages in the group.

14. The system of claim 9, wherein the plurality of log messages includes each of a first log message and a second log message, wherein the first log message is in a first format and the second log message is in a second format, and wherein the first format is different from the second format.

15. The system of claim 14, wherein the first log message includes a particular data field at a first position within the first log message, wherein the second log message includes the particular data field at a second position within the second log message, and wherein the first position is different from the second position.

16. The system of claim 14, wherein the first log message includes a particular data field represented using a first field name within the first log message, wherein the second log message includes the particular data field represented using a second field name within the second log message, and wherein the first field name is different from the second field name.

17. A computer-program product tangibly embodied in a non-transitory machine-readable storage medium, including instructions configured to cause a data processing apparatus to perform operations including:

receiving a plurality of log messages, wherein each log message of the plurality of log messages includes message data, and wherein the message data includes one or more detectable signatures to segment the message data into data fields;

mapping each log message of the plurality of log messages to a message structure, wherein the message structure defines a fixed portion or a variable portion of the message data as a data field;

detecting, for each log message of the plurality of log messages, one or more data fields within the message data, based at least in part on the one or more detectable signatures included in the message data and the mapping of the log message to the message structure, wherein each data field of the one or more data fields corresponds to a value present in the message data;

receiving, via a user interface, input corresponding to a query string for querying at least a portion of the plurality of log messages, the query string including one or more virtual data fields, wherein each of the one or more virtual data fields corresponds to a function of at least one data field of the detected one or more data fields, and wherein the one or more virtual data fields are not present in the detected one or more data fields or the message structure;

parsing the query string to identify each of the one or more virtual data fields;

in response to the parsing, formulating a response to the query string at least in part by:

querying one or more log data stores using the at least one data field, wherein the plurality of log messages are stored at the one or more log data stores, receiving, for each of the one or more log data stores, partial result data in response to the querying of the log data store, the partial result data including one or more results of querying log messages stored at the log data store, aggregating the partial result data received from each of the one or more log data stores to determine a preliminary result for the at least one data field, and performing the function on the preliminary result to determine a formulated response to the query string that included the one or more virtual data fields;

generating a log field view representing the formulated response to the query string, wherein the formulated response to the query string presents the preliminary result; and presenting, at the user interface, the log field view.

18. The computer-program product of claim 17, wherein a virtual data field of the one or more virtual data fields is based on a start of a transaction or an end of the transaction, wherein the transaction corresponds to a transaction identifier, wherein the transaction identifier is a detectable field in a log message of the plurality of log messages, and wherein the start and/or the end of the transaction is computed based on a set of log messages associated with the transaction.

19. The computer-program product of claim 17, wherein presenting the log field view at the interface includes presenting a table including each of the one or more virtual data fields, such that each of the one or more virtual data fields includes an associated one or more virtual data elements, and each of the one or more virtual data elements includes a value.

20. The computer-program product of claim 19, further comprising:
    receiving, at the interface, additional input corresponding to a selection of a virtual data element from amongst the one or more virtual data fields presented in the table; and
    identifying at least one log message associated with the selected virtual data element; and
    presenting information associated with each of the at least one identified log message.

21. The computer-program product of claim 17, further comprising:
    performing a group-by operation on the aggregated partial result data using the one or more virtual fields, wherein performing the group-by operation includes grouping log messages of the plurality of log messages into one or more groups, wherein log messages included in a group share a same attribute with other log messages in the group.

22. The computer-program product of claim 17, wherein the plurality of log messages includes each of a first log message and a second log message, wherein the first log message is in a first format and the second log message is in a second format, and wherein the first format is different from the second format.

23. The computer-program product of claim 22, wherein the first log message includes a particular data field at a first position within the first log message, wherein the second log message includes the particular data field at a second position within the second log message, and wherein the first position is different from the second position.

* * * * *

UNITED STATES PATENT AND TRADEMARK OFFICE
CERTIFICATE OF CORRECTION

PATENT NO. : 10,713,271 B2  
APPLICATION NO. : 15/888890  
DATED : July 14, 2020  
INVENTOR(S) : Das et al.

Page 1 of 1

It is certified that error appears in the above-identified patent and that said Letters Patent is hereby corrected as shown below:

In the Specification

Column 7, Line 35, delete "that that" and insert -- that --, therefor.

Column 27, Line 8, delete "Web-based" and insert -- web-based --, therefor.

In the Claims

Column 37, Line 3, Claim 9, delete "structure," and insert -- structure; --, therefor.

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*